United States Patent
Scarborough et al.

(10) Patent No.: US 9,953,274 B2
(45) Date of Patent: Apr. 24, 2018

(54) BIASED TICKET OFFERS FOR ACTORS IDENTIFIED USING DYNAMIC ASSESSMENTS OF ACTORS' ATTRIBUTES

(71) Applicant: Live Nation Entertainment, Inc., Beverly Hills, CA (US)

(72) Inventors: David Scarborough, Ashburn, VA (US); Samuel Levin, Los Angeles, CA (US); John Carnahan, Los Angeles, CA (US); Michael Horowitz, Manhattan Beach, CA (US); Alexander Hazboun, Los Angeles, CA (US)

(73) Assignee: Live Nation Entertainment, Inc., Beverly Hills, CA (US)

( * ) Notice: Subject to any disclaimer, the term of this patent is extended or adjusted under 35 U.S.C. 154(b) by 846 days.

(21) Appl. No.: 14/063,890

(22) Filed: Oct. 25, 2013

(65) Prior Publication Data

US 2015/0066546 A1   Mar. 5, 2015

Related U.S. Application Data

(60) Provisional application No. 61/872,211, filed on Aug. 30, 2013.

(51) Int. Cl.
*G06Q 10/02* (2012.01)
*H04L 29/06* (2006.01)
*G06Q 30/02* (2012.01)

(52) U.S. Cl.
CPC ............ *G06Q 10/02* (2013.01); *G06Q 30/02* (2013.01); *H04L 63/1483* (2013.01)

(58) Field of Classification Search
CPC ..... G06Q 10/02; G06Q 30/02; H04L 63/1483
See application file for complete search history.

(56) References Cited

U.S. PATENT DOCUMENTS 6,662,230 B1   12/2003   Eichstaedt et al.
7,584,123 B1   9/2009    Karonis et al.
(Continued)

OTHER PUBLICATIONS

Hayati, Pedram, et al. "Web spambot detection based on web navigation behaviour." Advanced Information Networking and Applications (AINA), 2010 24th IEEE International Conference on. IEEE, 2010.*
U.S. Appl. No. 14/214,323, filed Mar. 14, 2014, First Action Interview Office Action Summary dated Nov. 20, 2014, 10 pages.
U.S. Appl. No. 14/214,323, Final Office Action dated Jan. 28, 2015, 7 pages.
(Continued)

*Primary Examiner* — Daniel Vetter
*Assistant Examiner* — Scott M Tungate
(74) *Attorney, Agent, or Firm* — Kilpatrick Townsend & Stockton, LLP

(57) ABSTRACT

Techniques herein attempt to provide actors with more flexible and satisfactory experiences regarding obtaining tickets for an event. A learning model may identify attributes indicative of whether a particular actor (e.g., attempting to purchase tickets to an event) possesses a desirable characteristic (e.g., is likely to attend the event). Each actor can then be evaluated to estimate whether she is a good actor (possesses the characteristic). If so, favored opportunities may be made available, such as the opportunity to buy high-demand tickets. An actor may further have the opportunity to hold or reserve tickets for a period time, during which other actors cannot purchase them. A fee for holding or reserving tickets (and/or maintaining the hold or reserve) can be dynamically set based on market factors. Opportunities to modify seat assignments to allow a group of friends to sit together may also be provided.

20 Claims, 11 Drawing Sheets

(56) References Cited

U.S. PATENT DOCUMENTS

| | | |
|---|---|---|
| 7,970,713 B1 | 6/2011 | Gorelik et al. |
| 2002/0010620 A1* | 1/2002 | Kowalchuk ...... G06Q 10/06375 |
| | | 705/7.32 |
| 2003/0070096 A1 | 4/2003 | Pazi et al. |
| 2004/0117654 A1 | 6/2004 | Feldman et al. |
| 2007/0055554 A1* | 3/2007 | Sussman ................ G06Q 10/02 |
| | | 705/5 |
| 2008/0288988 A1* | 11/2008 | Yabe ................ G06F 17/30793 |
| | | 725/91 |
| 2009/0204819 A1 | 8/2009 | Parker |
| 2009/0204820 A1 | 8/2009 | Bradenburg et al. |
| 2010/0106671 A1 | 4/2010 | Li et al. |
| 2010/0144314 A1 | 6/2010 | Sherkin et al. |
| 2011/0292031 A1 | 12/2011 | Zhu et al. |
| 2013/0227078 A1 | 8/2013 | Wei et al. |
| 2014/0045456 A1 | 2/2014 | Ballai et al. |
| 2014/0278610 A1 | 9/2014 | Carnahan et al. |

OTHER PUBLICATIONS

U.S. Appl. No. 14/214,323, Advisory Action dated May 8, 2015, 5 pages.
Non-Final Office Action dated Oct. 8, 2015 for U.S. Appl. No. 14/214,323 9 pages.
U.S. Appl. No. 14/214,323, filed Mar. 14, 2014 Final Office Action dated Mar. 21, 2016, all pages.
U.S. Appl. No. 14/214,323, Preinterview first office action dated Jun. 11, 2014, 3 pages.

* cited by examiner

BIASED TICKET OFFERS FOR ACTORS IDENTIFIED USING DYNAMIC ASSESSMENTS OF ACTORS' ATTRIBUTES

CROSS-REFERENCE TO RELATED APPLICATION

This application claims the benefit of U.S. Provisional Application No. 61/872,211 filed on Aug. 30, 2013, which is hereby incorporated by reference in its entirety for all purposes.

BACKGROUND

This disclosure relates in general to methods and systems for offering tickets to an event, which may provide biases towards actors having favorable characteristics and may improve the flexibility associated with ticket purchases.

Conventionally, buying tickets for an event is often a stressful experience. As soon as tickets are on sale, ticket requests are frantically and immediately submitted. Any particular person who wants to attend the event frequently has a small chance of being able to attend at all, much less being able to secure desirable tickets. The person may feel pressured to request or purchase a ticket as soon as possible, having little information about what and/or whether tickets would be available to him. Will he be able to secure more than two tickets at a desirable spot? Will he be able to secure any tickets at all? With these unknowns, he may feel uncomfortable asking others if they wish to join him. Consequentially, when tickets are offered to the person, he may feel pressured to buy fewer tickets than he would like (for fear of his friends being unable to join him) or would feel anxious about a large ticket purchase (fearing that others would not be able to attend and he would then not be compensated for most of the purchased tickets).

SUMMARY

Techniques herein attempt to provide actors with more flexible and satisfactory experiences regarding obtaining tickets for an event. In the modern era, ticket providers are faced with a difficult scenario in which many ticket requestors or purchasers have no intention of attending an event. Rather, they may try to resell purchased tickets or control the ticket market (e.g., by dominating ticket requests). Ticket providers, therefore, use various verification steps and processing techniques in an attempt to reduce influence of these attempts. Meanwhile, true fans must also sift through the effects, which can be frustrating, Further, even these efforts are not completely effective, and fans are therefore also deprived of prime ticket offerings due to the offerings being accepted or stalled by other parties.

In some embodiments, a learning model determines one or more attributes predictive of a desirable characteristic. For example, the model may identify attributes of actors who redeemed tickets to a prior event. The attributes can include those that are objective and quantifiable and ones that would be difficult for an actor to quickly manipulate (e.g., a duration in a fan club, event attendances over the last year, or number of Facebook friends). Using some or all of the attributes, a characterization-assessment procedure can evaluate values of the attributes to estimate whether a given actor is a "good actor" (e.g., possesses the characteristic). If so, the actor may be provided with preferential opportunities, such as the opportunity to purchase tickets for prime seats, discount opportunities, opportunities to reserve or hold tickets and/or opportunities to be invoked in an assignment modification that would allow him to sit with friends. In some instances, good actors may be pushed towards a front in a ticket-request queue to give them quicker access to ticket options. The characterization-modification procedure can be repeatedly modified (e.g., to include other previously identified predictive attributes or to include attributes identified by a more recent execution of the model). This modification can make it difficult for actors to understand what attributes are being currently favored.

One opportunity that may be offered to actors is the ability to hold tickets. Specifically, an actor may identify one or more tickets and hold them, such that other actors cannot purchase them. The hold may be allowed for a particular time period that may or may not be extendable. Holding the tickets (and/or extending a hold period) may require a fee payment. During the hold period, an actor may be able to query others to determine whether they would like to accompany him to the event. This may inform his decision about whether he wants to purchase any, some or all of the held tickets. If other actors express interest, he may purchase the ticket for them and then transfer the ticket, or he may transfer the held ticket. At the end of the holding period, a default action can be performed (e.g., releasing the tickets to an available pool or purchasing the tickets). In some instances, an actor is given an opportunity to extend a holding period by paying a fee.

Another opportunity that may be offered to actors is the ability to reserve tickets. Specifically, an actor may be able to reserve tickets to an event at a time when the tickets are not yet available for purchase. For example, an actor may be able to reserve tickets to an NFL championship game where the New York Jets were playing. This reservation may be placed at a beginning of a season, well before it is known whether the Jets would even be playing in a championship game. If and when the ticket becomes available, the reserving actor may have a first right of refusal in terms of purchasing it.

Both the holding and reserving opportunities provide a ticket provider to adjust the opportunities in view of current market-demand properties. For example, maintaining a hold or reserve may require payment of an incremental or extension fee, which can be dynamically determined. As another example, the provider may decide disallow extensions or to decline any new reserve or hold requests.

Holding and/or reserving actors may also be provided with information reflecting market demand and/or available tickets remaining. This may inform the actor as to what ticket options may remain if he should release his tickets or decline purchase.

Actors frequently find that attending an event as a group is difficult. First, it is difficult to identify who (e.g., amongst a friend group) wants to and can go to the event. Second, there is the question of how tickets will be purchased in a coordinated manner. Thus, often, friends end up disbursed across a venue and may even be unaware that other friends are at the event. Techniques disclosed herein provide an actor with the opportunity to find other actors in a same group with ticket requests or ticket assignments indicating an intent to attend a same event as the actor. A modification can be identified that would modify group members' seat locations or placement in a queue ranking ticket requests to facilitate the group members being able to sit together. When necessary, requests to participate in the modification (e.g., along with an offered payment amount) may be sent to other actors who would be influenced by the modification but who are not part of the group. Upon receiving any sufficient approvals, the modification can be effected.

In some embodiments, a ticket management system for dynamically selecting attributes indicative of good actors, evaluating actors and selectively presenting offers to estimated good actors. An actor characteristic definer defines a characteristic of actors. A model engine uses a model to identify an initial set of attributes based on the characteristic and determines, for each actor in a first set of actors, a first value for each attribute in the initial set of attributes. The model engine also modifies the initial set of attributes and determines, for each actor in a second set of actors, a second value for each attribute in the modified set of attributes. A good-actor detector identifies a first subset of the first set of actors based on the determined first values; and identifies a second subset of the second set of actors based on the determined second values, wherein each actor in the second subset is estimated to be more likely to possess the defined characteristic as compared to actors in the second set of actors but not in the second subset, and wherein actors in the second set of actors are different from actors in the first set of actors. A ticket engine biases ticket offerings to favor actors in the second subset over actors in the second set of actors but not in the second subset.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes can be made in the function and arrangement of elements without departing from the spirit and scope as set forth in the appended claims.

Figure 1:
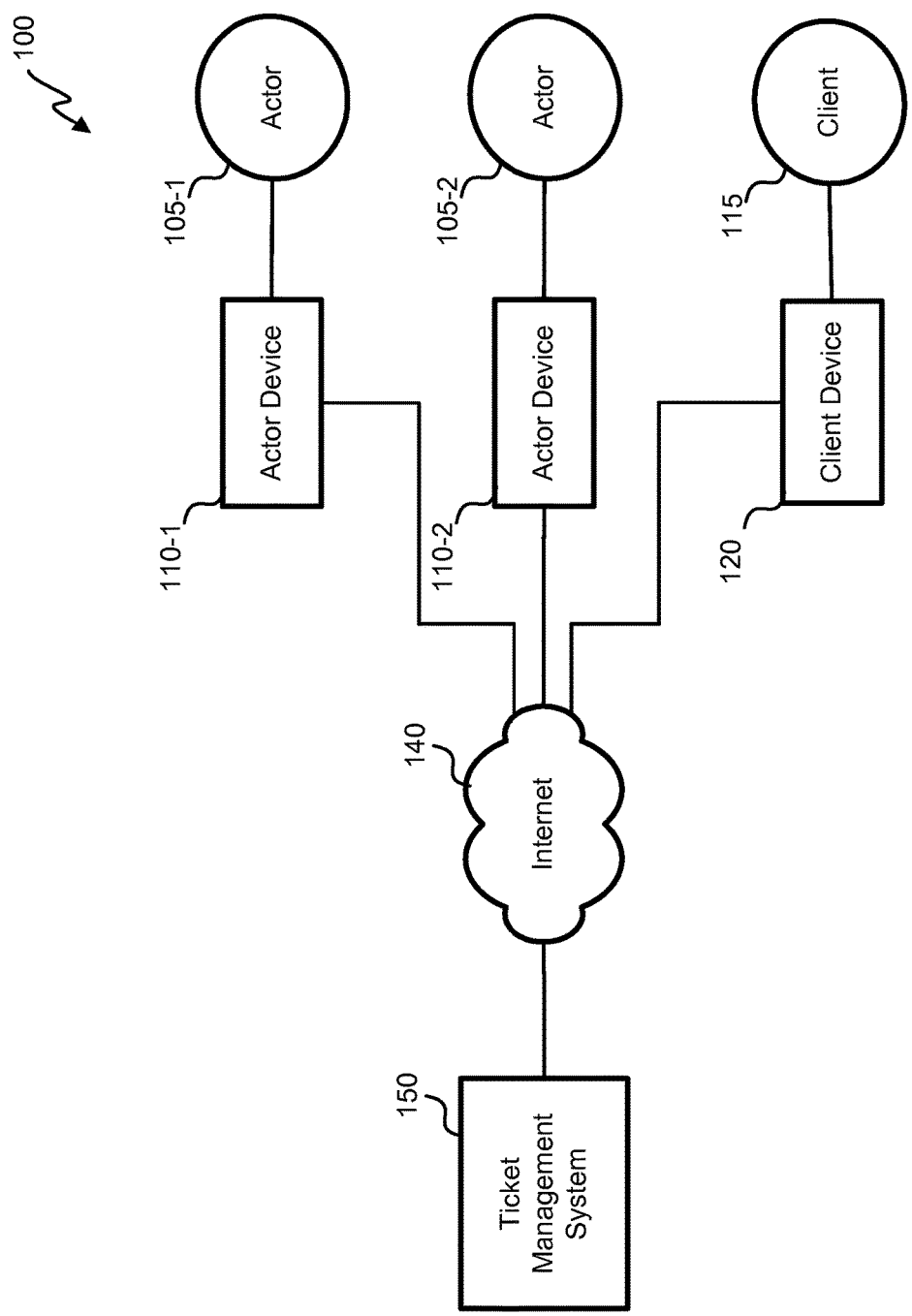
FIG. 1 depicts a block diagram of an embodiment of a ticket interaction system.

Referring first to FIG. 1, a block diagram of an embodiment of a ticket interaction system 100 is shown. Actors 105 and clients 115 can interact with a ticket management system 150 via respective devices 110 and 120 and a network, such as the Internet 140 or a wide area network (WAN), local area network (LAN) 114 or other backbone. Actors can include a potential ticket purchaser, a person estimated to be interested in attending an event (e.g., based on past event attendances, past ticket purchases, search histories, profile characteristics, and/or group memberships), a person attempting or having attempted to buy a ticket for an event, and/or a person interacting or having previously interacted with a website to purchase a ticket for an event. Clients can include a performer, agent of a performer, event provider and/or venue operator.

In some embodiments, ticket management system 150 is made available to one or more of actors 105 and/or clients 115 via an app (that can be downloaded to and executed on a portable electronic device) or a website. It will be understood that, although only two actors 105 and one client 115 are shown, system 100 can include different numbers of actors 105 and/or clients 115.

Using the ticket management system 150, a client 115 can define an event by identifying one or more performing entities, a name of the event, a genre of the event, a time or times of the event (where a "time" includes a date and time of day), and/or a location or locations of the event. Client 115 can also or alternatively select an event previously partly or fully defined. Client 115 can identify ticket information for the event, such as a number of tickets in a venue, a number and/or locations of available tickets, a number and/or locations of reserved tickets (e.g., for performers' friends and family), a price for each of one or more tickets (or sections), a number and/or locations of tickets that can be reserved by actors, and/or a section assignment for each of one or more tickets. Examples of events for which tickets can be obtained include sporting events, concerts, meals, shows, movies, lectures and amusement parks.

As described in further detail below, client 115 can further include preferences as to who tickets will be sold or offered to and/or details of ticket offerings presented to actors. For example, client 115 may specify that he wishes for tickets to be offered to any actors attempting to purchase tickets who are in a performer's fan club before the tickets are offered to actors attempting to purchase tickets who are not in the fan club. As another example, client 115 may specify that he would like for tickets in the first ten rows to be sold to actors likely to actually attend the event (or give them to friends who will accompany the actor to the event) and not resell the tickets. As another example, client 115 may specify that he would like for discounts on tickets to be presented to actors that follow the performer on a social networking site. As another example, client 115 may specify that she would like to have prime-location tickets offered first to actors who have reliably attended past local events of a given performer but sat in seats at relatively poor locations in the venue.

As described further below, ticket management system 150 can use the information provided by client 115 to allocate tickets for the event, generate an offer, present offer information to actors 105 and/or process offer acceptances. In some instances, ticket management system 150 uses one or more characteristics of actors to bias times, prices or presence of ticket offerings towards select actors. This bias can be defined based on client preferences. The bias can favor actors estimated to be true fans of a performer performing at an event and/or predicted to themselves attend the event. The bias can be against actors estimated to be robots and/or predicted to resell the tickets.

Ticket management system 150 can present information about the event to actors 105. The presented information can include, e.g., a name, performing entity, location and/or time of the event and/or a price and/or availability of tickets to the event. The information can be presented to all actors (e.g., all actors who visit a website, such as a ticket-sale website) or to select actors (e.g., those which a bias favors). It will be appreciated that presentation of an offer can include or can consist of transmission of the offer (e.g., to an actor's email account or to an account of the actor, such as an account on a social networking site).

Ticket management system 150 can access a bias, analyze characteristics of a particular actor, and determine whether and/or to what extent the actor is favored by the bias. For example, system 150 may estimate that actor 105-1 is a favored actor (e.g., a true fan) and/or that actor 105-2 is not (e.g., and is a robot). This analysis can be performed prior to offering of any tickets, during ticket offerings, and/or in response to detecting an input from an actor. For example, the analysis can be performed initially to identify favored actors to whom early ticket-purchasing offers will be sent to. As another example, system 150 may respond to each ticket request by assessing an actor initiating the request to identify a positive or negative bias and may adjust its response to the request (which may include an offer for tickets) appropriately. As another example, system 150 may generate a queue that ranks pending ticket requests. The ranks of the requests can be adjusted based on an extent to which and/or whether the actor is favored by the bias. In some instances, requests are ranked using a pseudo-random factor. Requests may also be ranked on past rankings, such that actors that were previously ranked highly (e.g., due to a favorable random element) are evaluated using a skewed random element, making it less likely that they will be similarly highly ranked for subsequent events. Alternatively, a downward rank offset (e.g., rank penalty of 50 ranks) or rank restriction (cannot be initially ranked in top 100) may be applied.

Ticket management system 150 can present an offer to purchase one or more tickets to each of one or more actors. The actors to whom the offer is presented to can include or can be actors for whom a bias favors. For example, ticket offers can be presented to actors estimated to be true fans of a performing entity and not to robots. In some instances, the offer is pushed to actors (e.g., by sending an email or presenting an offer on a webpage for specific actors). In some instances, the offer is presented in response to an action received by the actor indicating a desire to attend the event. For example, a webpage may announce an event and include buttons for proceeding to ticket purchasing. Upon selecting the button, an actor favored by the bias may be allowed to purchase tickets, while an actor not favored by the bias may be prevented from purchasing tickets.

In some instances, biases operate in a binary sense: offers (in general or with particular features, such as discounts or prime seats) are presented to favored actors and are not presented to non-favored actors. In some instances, biases operate in a temporal sense: offers are first presented to favored actors and are subsequently presented to non-favored actors. For example, favored actor may have a first right-of-refusal to purchase desirable tickets or tickets may only be offered to favored actors during a set time period.

Offers can provide actors with the opportunity to purchase tickets to one or more particular events at one or more particular locations. The offer may include a particular price. The offer may include one or more particular seats. An actor may, or may not, have the ability to select one or more seats and/or to identify a number of tickets for purchase. Thus, in some instances, an offer includes merely an invitation to offer. In these instances, references herein to an actor's acceptance of an offer may technically include an offer for tickets to be purchased.

An actor presented with the offer can accept the offer, which may require an agreement to pay for one or more tickets or actual payment for the one or more tickets. In some instances, additional interactions occur between presentation of the offer and acceptance of the offer. For example, the actor may select a number of seats to purchase, and ticket management system 150 may identify locations with an available block of seats of the number yet available. Also or alternatively, the actor may select one or more specific seats among those offered. Ticket management system 150 can confirm their availability.

Ticket management system 150 can assign purchased tickets to the purchasing actor. The assignment can include associating information about the actor and/or an identifier of the actor with an identifier of the ticket and/or seat of the ticket. The association can be stored in a ticket database. A virtual or printed version of the ticket can be generated and transmitted to an actor device.

Figure 2:
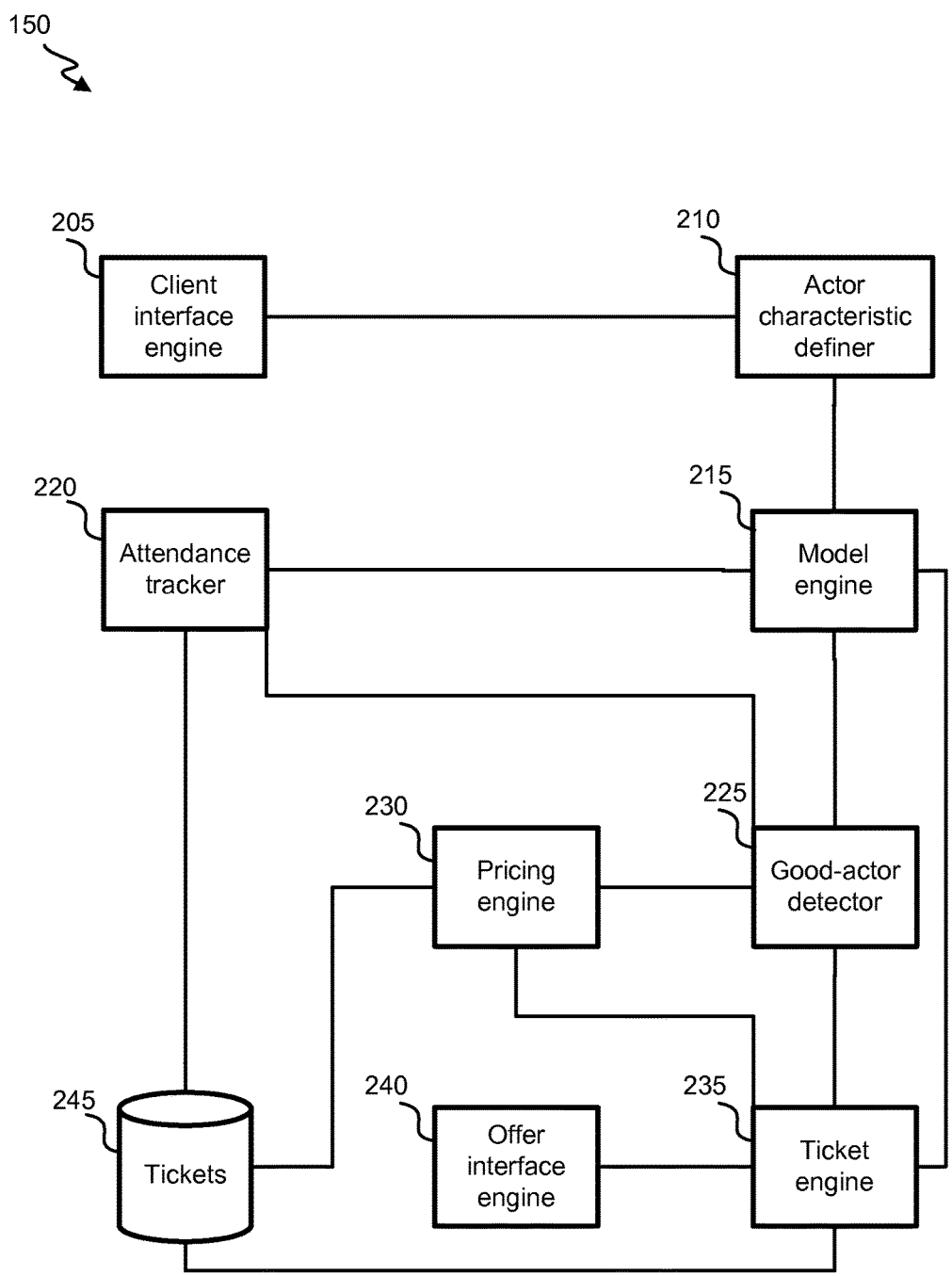
FIG. 2 depicts a block diagram of an embodiment of a ticket management system.

Referring next to FIG. 2, a block diagram of an embodiment of ticket management system 150 is shown. Ticket management system 150 can be, in part or in its entirety, in a cloud. In some instances, at least part of ticket management system 150 is present on a device, such as an actor device 110 and/or client device 120. For example, a client interface engine 205 can be on actor device 105, and a model engine 215 can be in a cloud. In some instances, part of a component resides in a cloud and another part of the component resides in a device. Thus, ticket management system 150 can include a distributed system.

Ticket management system 150 includes client interface engine 205, which facilitates communications between ticket management system 150 and a client 120. Client interface engine 205 can receive information from the client, such as event-defining information, ticket information and/or bias preference information. In one instance, client interface engine 205 presents a plurality of characteristics to a client via a client device. The client can then select one or more characteristics as being favorable or unfavorable.

An actor characteristic definer 210 can identify a favored or unfavored characteristic. The characteristic can be fixed or can vary in time or based on client input. A favored characteristic can include being a fan of a performer, having some characteristic indicative of being a fan of the performer (e.g., belonging to a fan group) or being estimated to be a human. An unfavored characteristic can include being likely to resell a ticket, being unlikely to attend an event or being estimated to being a robot. A favored or unfavored characteristic can include a demographic characteristic, such as an age group, residential city or income level. A favored or unfavored characteristic can relate to past event attendances, such whether the actor attended more or less than a threshold number of events attended at a given venue or for a particular of performer, a percentage of events for which tickets were purchased that the actor attended and/or seat locations for previously purchased tickets or event attendances. In some instances, a favored or unfavored characteristic is objective or one that can be easily measured or quantified. In some instances, one or more indicators are objective and/or can be easily measured or quantified and indicate whether a given actor has a specific favored or unfavored characteristic. The one or more indicators associated with a characteristic can be identified by actor characteristic definer 210.

Actor characteristic definer 210 can identify the favored or unfavored characteristic (and/or any associated indicators) to a model engine 215. Model engine 215 can collect a value for each attribute in a set of attributes for each actor in a set of actors. The values can be numeric or binary. In some instances, the values can be of other types, such as strings. Some or all of the set of attributes can be predefined by system 150 and/or can be identified in input from a client received by client interface engine 205. The attributes can relate to interactions with ticket management system 150, interaction with other electronic (e.g., online) systems, membership to one or more groups, past event attendances, and/or information in actors' profiles (e.g., input by the actors).

Examples of attributes relating to interactions with ticket management system 150 can include, e.g., a number and/or interval of ticket requests or website accesses; a number or type of tickets purchased; a variability of a number of type of tickets purchased; a number of offers for tickets made by system 150 to the actor; a number of ticket transfers sent or received; a speed of responding to presentations; an accuracy of clicking buttons (e.g., perfectly centered clicks causing suspicion that the actor is a robot); a path of page navigation (e.g., perfectly efficient page navigation causing suspicion that the actor is a robot); and/or accuracy of responses to robot-detection questions. For example, an attribute may have a high value when an actor routinely attempted to attend events for a given performer but infrequently succeeded in being offered tickets.

Examples of attributes relating to interaction with other electronic systems may include whether the actor entered a search term in a search engine corresponding to an event (e.g., a performer's name or a genre of the event); whether the actor is a fan or subscriber of an electronic group for a performer; whether the actor positively responded to an electronic presentation representing the performer (e.g., whether he "liked" a performer's Facebook page) and/or whether the actor follows the performer. Attributes can include temporal information about such interactions, such as how long ago an actor "liked" a performer's Facebook page or started following the performer. Attributes can include frequency or duration information about such interactions, such as how much time an actor spent on a performer's Facebook page during a particular interval. Values of attributes relating to interaction with other electronic systems can be determined by analyzing cookies associated with the user, linking an actor's profile to a profile on another website (e.g., upon receiving the actor's permission) or receiving information from another website.

Examples of attributes that relate to membership to one or more groups may include whether the actor is a member in a performer's fan group or whether the member is a member in a club with a quality tied to the event. For example, the attribute can indicate whether the actor is a member of a fantasy football league on a given website or whether the actor is a member of a local country-music club. In some instances, the group is not tied to the event. For example, the group can be a good-Samaritan group (e.g., with members donating time to help others); a burdened group (e.g., with members suffering from a disease); or an accomplished group (e.g., with members having achieved a high GPA for the last semester). Other example attributes is how long the actor has been a member of the group and/or how active the member has been in the group (e.g., a number of postings to a discussion board or a number of accesses to a website for the group).

Examples of attributes that relate to past event attendances may include whether an actor attended a specific event, any of certain events (e.g., any prior "home" games for a football team or any local comedy show in the last year), a number total events or events of a specific type attended and/or a seat location associated with the actor's attendance of the event. For example, an attribute may have a high value if an actor consistently attended local events of a performer but routinely sat amongst the worst seats.

An attendance tracker 220 can determine whether an actor attended an event. In some instances, attendance tracker 220 monitors sales and transfers of tickets. Attendance tracker 220 may then assume that the last holder of the ticket attended the event. In some instances, attendance tracker 220 receives communications from ticket scanners at one or more entries of an event. The communications can identify a ticket being scanned, and attendance tracker 220 can then assume that the holder of the ticket (e.g., an initial purchaser or a final transferee) attended the event. The communications can also or alternatively identify a person presenting a ticket, such that attendance tracker 220 can easily identify the attendee. In some instances, attendance tracker 220 receives input from actors indicating that they attend an event. For example, agents at a venue may distribute information to attendees inviting them to inform attendance tracker 220 of their event presence. The invitation can include a code, which may be tied to the attendee's seat and to the event, which the invitee can, e.g., input at an identified webpage, email to an identified email address or text to an identified number. The attendee may further include her name and/or a login name for a website associated with system 150.

Examples of attributes that relate to actors' profiles includes an actor's place of residence, demographic information (e.g., an actor's age) and/or whether (or a degree to which) an actor is interested in a particular event category (e.g., arts, music or sports), a performers of interest, a profession (e.g., such that ticket offerings may be biased towards media professionals) and/or a venue and/or a preferred ticket price range. The value can be set by an actor (e.g., by identifying favorite event categories) or can be automatically determined (e.g., based on event searches, ticket requests, ticket purchases, online searches and/or group memberships).

Model engine 215 can then receive, for each actor in a set of actors, a value for each of one or more attributes. Model engine 215 can access (e.g., receive from a client or storage) reference information. The reference information can include information that can be used to identify one or more actors for which it can be assumed that they possess a given characteristic and/or one or more actors for which it can be assumed that they do not possess a given characteristic. For example, a client can input a list of known fans, or a model engine 215 can assume that actors that actually attended three or more of a performer's events are true fans. As another example, model engine 215 can assume that anyone who has purchased over 100 tickets in a given month is likely to be a robot and is very unlikely to be a true fan. The reference information can be such that assumptions made based on the information have a low false-positive rate.

Using the reference information, model engine 215 can then use a model and values of other attributes to determine what other attribute values are likely indicative of the characteristic. This can be determined by identifying attribute values consistent across a group of actors assumed to possess (or assumed to not possess) a characteristic. For example, suppose that it is assumed that actors who attended an event are people and that actors who have purchased over 100 tickets during the last month are robots. Model engine 215 may identify that no actors who belonged to a performer's fan group purchased over 100 tickets but that 20% of the fan group attended a most-recent event of the performer. Model engine 215 may then conclude that membership in a fan group is an indicator that an actor is not a robot. Using a subset analysis, model engine 215 can select a subset of actors for whom each is assumed to possess or to lack a characteristic. Analysis of values of other attributes of those actors can identify which of these other attributes are indicative of the characteristic presence.

In another instance, values of attributes are analyzed across a group of actors for which it is unknown whether they possess or lack the characteristic. Model engine 215 can also or alternatively use a correlation technique, a learning technique, a clustering technique, an association technique or a regression technique to identify one or more attributes and/or attribute values indicative of a characteristic. For example, a clustering technique receiving duration of fan-club durations may identify a cluster spanning 1-10 years and another cluster spanning 0-15 days. Model engine 215 can further detect that values associated with the actors purchasing over 100 tickets are all within the 0-15 day cluster. Thus, model engine 215 can estimate that an indicator tied to a characterization tied to attending many events or being a real fan is belonging to a performer's fan club for more than one year. As another example, a correlation technique can determine that a value of a number of attendances to a particular performer's events is highly correlated with an amount of time spent on the performer's Facebook page. Thus, model engine 215 can estimate that an indicator tied to a characterization tied to attending many events or being a real fan is an amount of time spent on a performer's Facebook page.

Using the attribute and attribute-value identifications, model engine 215 can generate a characterization-assessment procedure, which can be applied to estimate whether a given actor possesses a given characteristic. The procedure can include an analysis, algorithm and/or formula. The procedure can be performed using a value of each of one or more specific attributes. The procedure can include multiple procedure elements which may be evaluated together using Boolean operators (e.g., such that the procedure produces a positive result if a result of any element is positive or only if the results of all elements are positive). Each procedure element may relate to a different attribute or a different combination of attributes. In some instances, a result of performance of the procedure and/or procedure element is binary: either it is positive (in which case it can be estimated that an actor does or does not possess a characteristic) or it is negative. In other instances, a result is non-binary (e.g., a numeric score), which can indicate a confidence of the result and/or a degree to which it is estimated that an actor possesses a characteristic (e.g., how strong of a fan an actor is).

Model engine 215 can include a random element. Thus, for example, if five attributes are indicative of whether an actor is a fan, a procedure can evaluate one or two. As another example, a value of each attribute can be analyzed and a result of the analysis can be weighted using a weight with a random element. Model engine 215 can then adjust the presence of attributes in an evaluation or a weight of attributes. This adjustment can prevent actors for identifying how actors are analyzed, which would otherwise provide bad actors with any opportunity to trick system 150.

In this regard, model engine 215 can include a learning algorithm that can detect when it seems as though actors seem to be altering their activity in an attempt to cause system 150 to falsely characterize the actors. For example, the learning algorithm can detect shift in a relative size of clusters of attribute values. As another example, the learning algorithm can detect an acceleration or increase in a number of actors estimated to possess a positive characteristic or to lack a negative characteristic. Upon such detection, the learning algorithm can initiate an adjustment in the characterization-assessment procedure, such that the procedure evaluates different attributes or changes weights of attributes. In some instances, such an adjustment is made additionally or alternatively at regular or random time points.

Model engine 215 can send the characterization-assessment procedure to a good-actor detector 225. Good-actor detector 225 collects, for each actor to be assessed, values of attributes to be evaluated in the procedure. For example, good-actor detector 225 can access a data store that stores attribute values in association with particular actors. Good-actor detector 225 performs the procedure using the values. As another example, attendance tracker 220 can report to good-actor detector 225 about which events a particular actor attended and when the events were attended. A result of the procedure can include an estimate as to whether a given actor possesses the actor characteristic defined by actor characteristic definer 210. Upon a positive estimation, the actor is characterized by detector 225 as being a good actor.

In some instances, good-actor detector 225 may be unable to retrieve a value for an attribute for a particular actor. The data may be unavailable (e.g., because the actor did not include specific information in his profile, because cookies did not include the information, etc.). In one instance, good-actor detector 225 may then set the value to a neutral value or to a pessimistic value. The pessimistic value may be a value at an end of a spectrum (e.g., at an end opposite to a good-actor end). For example, suppose that an attribute was a number of posts on a Facebook page of a performer, and suppose that a high number of posts favored a characteristic of being a good actor. If an actor did not identify her own Facebook page, good-actor detector 225 may assume that the actor made zero posts. In one instance, good-actor detector 225 may modify the procedure to remove consideration of that attribute (e.g., by increasing a weight of other attributes).

The result of performing the procedure may be binary or non-binary. In some instances, a result is a score that reflects an estimate of an extent to which an actor possesses the characteristic or a confidence of the characteristic assessment made by detector 225. For example, if an actor attended all of a performer's events over the last year, they may be assigned a score of "10" on a fan-score scale, while a fan attending only local events may be assigned a score of "5".

The characterizations made by good-actor detector 225 can influence ticket opportunities available to particular actors and/or can influence prices of tickets made available to particular actors. Thus, good-actor detector 225 can transmit its characterizations to a pricing engine 230 and/or a ticket engine 235.

Pricing engine 230 sets a price for each ticket. Base prices can be set based on, e.g., a performing entity, a venue, an event time, sales of past similar events (e.g., at a same entity and with a same performer or a performance of a similar genre), past sales for a same event (e.g., a percentage of tickets sold), a location of a given seat (e.g., its section), pricing preferences identified by a client (e.g., an identification of a desired minimum percentage of tickets sold or total revenue) and/or pricing restrictions identified by a client (a minimum ticket price for a ticket assigned to a section, a global minimum ticket price, a maximum ticket price for a ticket assigned to a section, a global maximum ticket price, a minimum total revenue for the event, and/or a defined ticket price globally or for a section). Pricing engine 230 can also identify variations to the price that will be enforced upon estimation of particular actor characterizations. For example, ticket prices may be discounted if good-actor detector 225 identifies an actor as being a good actor. The discount can be a global fixed or percentage amount, or an amount that depends on a specific ticket (e.g., its section). In some instances, the discount is one that reduces the ticket's price to a fixed value. Thus, for example, tickets in the five front rows may be discounted by $200 for good actors, while tickets in the last rows may be discounted by 15%. In some instances, a ticket's price depends on a score identified by good-actor detector 225—with actors associated with better (e.g., higher) scores being offered tickets at cheaper prices than would be otherwise offered.

Ticket engine 235 can generate offers for tickets, present the offers (e.g., by displaying the offer on a webpage, sending it to an email address, presenting it on an app, etc.) respond to ticket requests and assign tickets. Ticket engine 235 can further coordinate the ability for actors to reserve tickets or to place ticket purchases on hold. Ticket engine 235 can update an account of an actor to reflect any assigned, held or reserved tickets. For held or reserved tickets, a time remaining in a hold or reserve period may also be identified in the account (e.g., to facilitate presenting such information to the actor). For assigned tickets, the actor may be able to access (e.g., view or print) the ticket from the account.

Ticket engine 235 can manage, update and monitor ticket data store 240. Ticket data store 240 can be used to reflect, for a given event, which tickets are; available, reserved, on hold and/or assigned. Ticket data store 235 can further include information indicating when the tickets were purchased, reserved or placed on hold; and/or whether there are any restrictions on ticket transfer or purchase (e.g., identified by a client 115, identified based on a discount code, or identified based on a ticket type).

Each ticket may be associated with one or more prices (e.g., a normal price, a good-actor price and/or a bad-actor price; or a scale of prices along which a price is to be selected based on an actor characterization score), an actor (e.g., reserving or holding the ticket, to whom the ticket is assigned, or who claimed the ticket). A ticket can be held for, reserved by or assigned to an actor upon receiving the actor's consent or request for such and/or upon collecting appropriate payments. In some instances, a purchasing actor can identify another actor to whom to assign the ticket.

Assigning a ticket can include generating an electronic ticket or paper ticket (which can be sent by courier to the actor or held at a location for the actor). An electronic ticket can include a code (e.g., an optical code, barcode, alphanumeric code, etc.). The electronic ticket can include one that can be presented on a display of the actor's mobile device, can include a file that can be printed, can include a token that can be electronically read (e.g., via an RF read, such as an NFC reader). The electronic ticket can be stored in association with an electronic record of an identification instrument of the actor (e.g., a credit card/credit card number or driver's license number of the user), such that when the user presents the identification instrument, the identification instrument may be read by an optical, magnetic, RF, or other scanner (or have an associated number manually entered via a keyboard), and system 150 may determine from an identifier scanned from the identification instrument whether there is a ticket for the event associated with the identification instrument.

A ticket in a queue can represent and/or a information about the event and/or information about the specific ticket (e.g., section and/or seat number). An assigned, reserved or held ticket can include or otherwise be associated with an actor's name (or username). Assigning the ticket(s) can include presenting (e.g., which can include transmitting) a ticket to an actor (e.g., to the actor's email) or granting access to a ticket via an account of the actor.

Ticket engine 235 can bias offers, ticket-request responses and/or ticket assignments to favor good actors. For example, ticket engine 235 can cause offers to be presented to good actors before other actors. As another example, ticket engine 235 can move requests for tickets from good actors up a queue, such that good actors having an improved chance of securing tickets for an event or an improved chance of securing high-demand tickets for an event. As another example, ticket engine 235 can, during a time period, only respond to ticket requests from good actors. As another example, ticket engine 235 can present prime-location tickets only to good actors or to good actors before they are presented to other actors. Prime-location tickets can include tickets empirically in high demand, those with good visibility of a performance, and/or those close to a performance.

Ticket engine 235 can further provide good actors with additional ticket purchasing opportunities. The ticket purchasing opportunities can include, e.g., the opportunity to receive a refund on the purchase (e.g., if requested before the event's occurrence), a longer opportunity to receive a refund on the purchase, a reduced fee for the opportunity to receive a refund on the purchase, the opportunity to reserve one or more tickets (e.g., while evaluating one's own schedule or while attempting to find others to accompany the actor to the event), a longer opportunity to reserve tickets, or a reduced fee for the opportunity to reserve one or more tickets.

Figure 3:
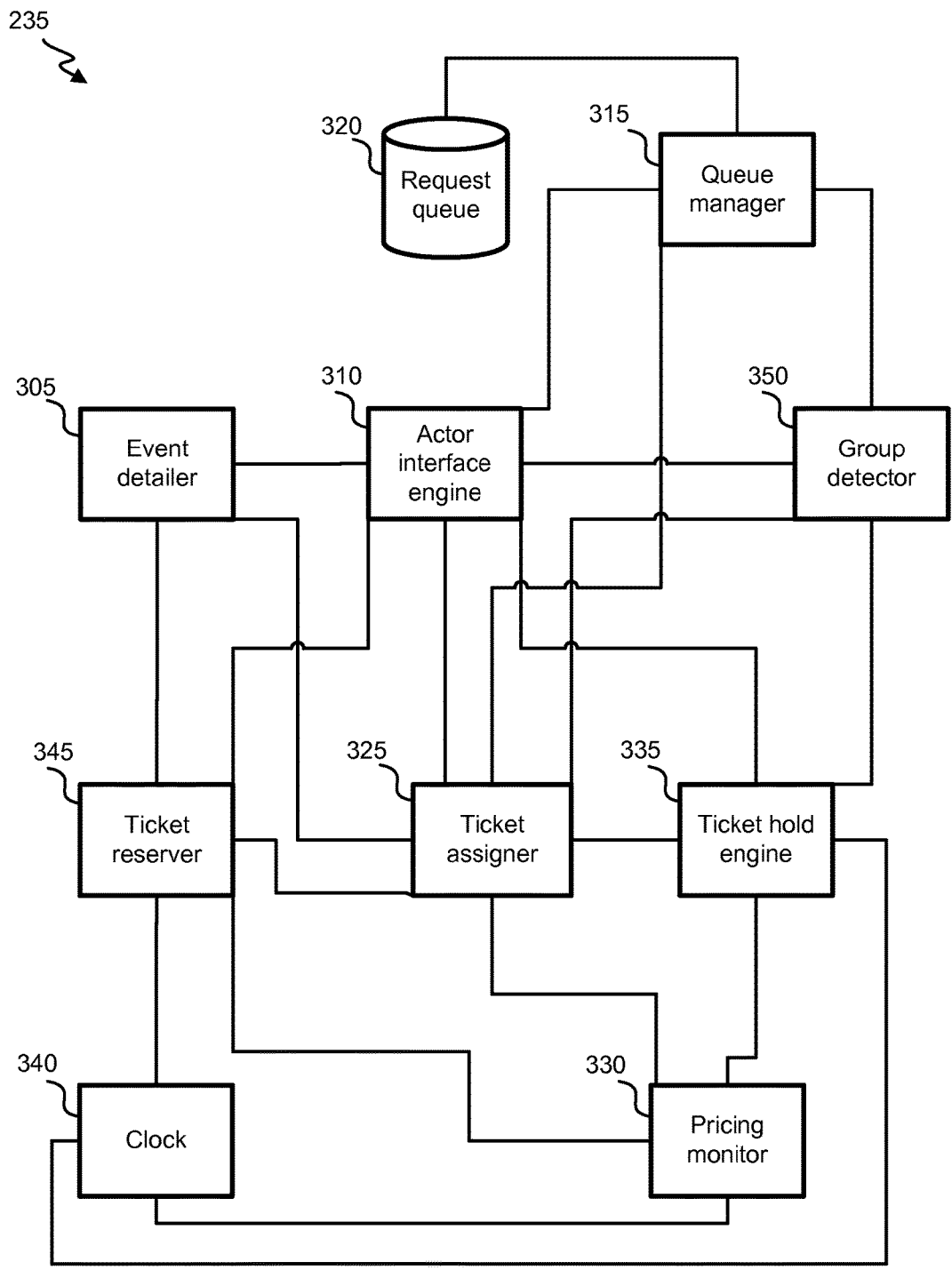
FIG. 3 depicts a block diagram of an embodiment of a ticket engine.

Referring next to FIG. 3, a block diagram of an embodiment of ticket engine 235 is shown. Ticket engine 235 includes an event detailer that collects information about an event. The information can include whether the event is certain to occur, a one or more performing entities, a venue, an event name and/or a time (which can include a date). Using the collected information, event detailer 305 can determine whether there is sufficient information for actors to purchase tickets for the event (e.g., if the time, venue and performing entity or entities are known) or whether there is sufficient information for actors to reserve tickets for the event (e.g., if the event is certain to occur). Event detailer 305 can relay its determination to a ticket assigner 325 and/or to a ticket reserver 345.

Event detailer 305 can further relay the event details to an actor interface engine 310, which can generate a presentation of the event and present the presentation (which can include transmitting the presentation), such that actors are informed of the event. The presentation can include an offer to purchase or reserve tickets. The presentation can further include related available opportunities, such as the ability to place a hold on tickets. The presentation that is presented can vary depending on which actor device the presentation is presented to. Presentations to devices of good actors may include presentations of, e.g., better available tickets, reduced fees, better hold opportunities, and/or better reserve opportunities as compared to presentations to devices of other actors. Thus, actor interface engine 310 can receive information from good-actor detector 225 to determine whether a device is estimated to be that of a good actor.

Actor interface engine 310 can detect actions from actors. In one instance, an actor may indicate that he wishes to purchase a ticket. In some instances, this indication causes a queue manager 315 to add a request to a request queue 320. A single event can have one or more queues (e.g., each related to a section or price range). A request can be added to a queue when it is expected that, e.g., there will be more ticket requests than tickets, that ticket requests should be differentially handled based on actor qualities, and/or that tickets are not yet available for purchase or reserve. Queue manager 315 can manage placement of various requests within the queue. For example, requests may be ranked depending on a time that the request was received, whether (and/or to what extent) an actor associated with the request was deemed to have a characteristic or be a good actor, a number of tickets being requested, and/or a price range of tickets being requested.

In some instances, when an actor indicates that he wishes to purchase one or more tickets, ticket assigner 325 can begin a process to assign the ticket(s) to the actor. Ticket assigner 325 can coordinate with a pricing monitor 330 to collect payment from the user. Upon verification from pricing monitor 330 that payment has been collected, ticket assigner 325 can assign the ticket(s) to the actor. This assignment can include associating an identifier of the ticket(s) with an identifier of the actor in ticket data store 240 and/or from removing the ticket(s) from an available ticket pool. The assignment can also include generating an electronic or print ticket and making the ticket available to the actor (e.g., such that it can be printed or downloaded or displayed on an electronic device).

Rather than assigning tickets responsive to receiving a request, ticket assigner 325 may communicate with queue manager 315 to select ticket requests at a front of queue 320. Ticket assigner 325 can then communicate with a device of an actor initiating the request (communicating via actor interface engine 310) to present available tickets and confirm ticket-purchasing intention. If the actor confirms the intention and submits payment (as verified by pricing monitor 330), ticket assigner 325 can assign the ticket.

An actor may be leery to submit payment for tickets. For example, suppose that the actor would like to attend a sporting event with a group of friends, but she has no interest in going alone. Upon realizing that she could obtain great seats to the event, she may wish to consult with friends to determine whether any will be able to join her. She may also wish to ensure that the other attendees will contribute to the tickets' price. Thus, an actor may select tickets and request that they be put on hold.

Ticket hold engine 335 can determine to which actors a hold is available. Ticket hold engine 335 can use this determination to either present hold options to select users or to appropriately respond to hold requests. When a hold is allowed, ticket hold engine 335 can associate an identifier of a ticket with an identifier of an actor and change a status associated with the ticket to "held". The ticket would then be unavailable to be held by or purchased by other actors while in the "held" state.

Ticket hold engine 335 can allow actors to hold tickets for up to a fixed time (e.g., 48 hours) and may or may not allow actors to extend the hold time. In some instances, longer hold times or extension possibilities are selectively granted to actors characterized as good actors.

At the end of the hold period, one, some or all of the tickets can be purchased or released. Released tickets then become again available to others (e.g., any other actor or a next actor selected from request queue 320). Ticket hold engine 335 can determine whether to assign or release the ticket(s) at the end of the hold period using any of a variety of techniques. Ticket hold engine 335 can use an opt-in process where a purchase fee is charged and tickets are assigned only if an actor identifies that he wants to purchase the tickets. Ticket hold engine 335 can use an opt-out process where such fees are charged and tickets are assigned unless the actor releases a hold on the tickets. A combination of opt-in and opt-out processes may also be used. For example, ticket engine 235 may use the opt-out process only if at least some payment has been made (e.g., by the actor or by another actor) or if a held ticket has been transferred to another actor's account; otherwise, the opt-in process may be used.

Ticket hold engine 335 can coordinate and/or initiate a process by which other actors can be alerted of tickets held by a holding actor. The alert can be sent to actors specifically or generally identified by a holding actor (e.g., actors with user names joesmith, mikemillan and sue1587; or actors with email addresses in a holding actor's address book). The alert can identify an event associated with the tickets (e.g., a name, performing entity, venue and/or time), a cost of to purchase a held ticket, a number of held tickets, any held tickets already claimed, and an identification of a holding actor (e.g., her name). The alert can be transmitted to an account or device of the other actors or to another system (e.g., managing email accounts or a social-networking site) to send on to accounts of other actors. Other actors can respond to the alert by, e.g., claiming or requesting a held ticket, sending a message (e.g., to confirm or decline event attendance) and/or contributing to funds for the ticket.

Ticket hold engine 335 may allow held tickets to be transferred to other actors' accounts. For example, a holding actor can identify another actor (e.g., by an account name), which can cause ticket hold engine 335 to transfer the held ticket to the other user. This can amount to updating ticket data store 240 to associate an identifier of the ticket with an identifier of the other actor. The other actor may, or may not (depending on the embodiment), need to agree to the transfer prior to transferring the held ticket. Subsequent to the transfer, the other actor may then be able to purchase the ticket. The ticket may be transferred in a hold state. One issue is how long it can remain in that state prior to arriving at a release-or-purchase decision point. In one embodiment, a default hold period is initiated, such that the decision must be made by the end of the period. In this instance, the ticket may then be held for a period of time exceeding the default hold period, as it may have also been held by the transferor actor. In one instance, the hold period applicable pre-transfer remains in effect. For example, if the transferor actor would have only been able to hold the ticket for 48 hours, and she transferred it after 24 hours, the transferee actor would be able to continue to hold the ticket for 24 hours. In one instance, the hold period is determined based on whether and/or to what extent the transferee actor is a good actor.

In some instances, ticket hold engine 335 allows other actors to contribute funds to tickets held by an actor. Contributing actors may be able to see tickets held by a holding actor and/or select particular held tickets for which the contribution is to be associated with. The holding actor may be able to see identifiers of contributing actors, amounts contributed and dates contributed. In some instances, a holding actor may be able to specifically or generally identify actors to allow to make contributions (e.g., Jim, Mary and Alice; or any Facebook friend). In some instances, despite contributions, tickets are assigned to the holding actor. In some instances, upon receipt of sufficient contributions (e.g., a ticket price), the ticket is assigned to the contributing actor (thereby taking off of hold).

Holding a ticket may require fee payment, which can be an initial fee and/or an extension fee. Either or both fees can be globally fixed or depend on a performing entity, a venue, a location, a performance time, a restriction or fee-identification from a client, a preference from a client (e.g., identifying a desired minimum or maximum total amount of reserve fees or a minimum or maximum number of tickets held (in total or at a given time) by actors), a previous number of reservations made, a price for which tickets for the event are being offered or sold on in a secondary market, and/or whether or to what extent an actor is characterized as a good actor. In some instances, an actor may be able to identify a desired hold time. Hold times of various durations may be priced differently. In some instances, hold fees depend on an actual time period that tickets are on hold. For example, an actor may put tickets on hold for up to one week, though the hold fee may be $5 per ticket pert day. If the actor releases or purchases the tickets after three days, he would be charged $15 per ticket. If the actor does not release or purchase the tickets by the week's end, he would be charged $35 per ticket and the tickets would then be automatically released or assigned (with purchase fees being collected) according to default protocols.

Holding tickets for extended durations may require payment of extension fees. For example, holding a ticket for 24 hours may require payment of $5, and payment to hold for each additional day (e.g., up to a maximum of 10 days) may require a payment of an additional $5.

Initial and/or extension fees may be fixed or may vary (e.g., to vary with market demand, an amount of time remaining before an event, and/or an amount of time that the ticket has already been reserved). For example, extension fees may increase (e.g., on a per-time-period basis) as a total prior hold period increases. In some instances, an up-front hold fee and/or extension fee(s) can contribute to a ticket fee if the ticket is ultimately purchased. If extension fees are not paid, ticket engine 235 may release the tickets back into a general ticket pool, such that other actors will have the opportunity to purchase them.

In order to monitor whether an initial, extended or told hold time is about to or has expired, ticket hold engine 335 can receive data from a clock 340. Ticket hold engine 335 can detect a time at which a hold began and determine a time when a hold period will expire. Ticket hold engine 335 can then give actors the opportunity to extend a hold period prior to an expiration time. Ticket hold engine 335 can further take appropriate action upon expiration of a hold period.

Thus, event detailer 305 may collect available details for an event. Actor interface engine 310 can present the details and an option to hold tickets for the event. An actor can opt to hold tickets, which may include selecting one or more seats and/or submitting a hold fee. Ticket hold engine 3355 can then update ticket data store 240 to associate an identifier of the actor with an identifier of a ticket and to identify a status of the ticket as being "held". Clock 340 can be used by ticket hold engine 335 to detect when a hold period has expired. Pricing monitor 330 can monitor to determine whether payment has been submitted during a reservation period. If payment has not been received by an expiration of a hold period, ticket hold engine 335 can release the tickets in queue 240. Otherwise, ticket assigner 325 can assign the tickets to the actor.

Holding opportunities can be available for single-event tickets and/or season tickets. For example, an actor may place a hold on one or more tickets (e.g., at a same seat location) for each home game in a season (e.g., by paying a fee or because she is characterized as being a good actor). The actor may then have the opportunity to buy or release the tickets for each event. Releasing them could return the tickets to a general pool. Should the actor decide to purchase the tickets, the tickets may be available at a season-fixed (constant across the season) or event-specific (a price reflective of price variations across games within a season). Further, the price may be discounted due to the season-ticket hold and/or for any good-actor characterization. A season-ticket hold may provide actors with an opportunity to have a first right-of-refusal for specific seats.

Holds can have limitations. For example, whether a hold may be made may depend on whether or to what extent an actor is characterized as a good actor, a seat at issue, a performing entity, a venue, a performance time, a length of a ticket-request queue, a time remaining before the event, a number of tickets sold, and/or for which seats tickets have been sold. As another example, there may be limits on a number of tickets that an actor can hold and/or a maximum time that tickets can be held.

A ticket is "held" when the same ticket may actually be purchased. A ticket can alternatively be "reserved" when the same ticket cannot be purchased but has the possibility of later being for sale. This circumstance may arise due to the presence of sufficient current unknowns associated with the event. For example, an event's performing entity, location or time may be unknown. A ticket may be one to a tournament game or playoff game, where the performers and location cannot be determined early in the season. A reservation can serve to provide the reserving actor with a first right of refusal upon finalization of the event. In some instances, the first right of refusal is conditioned upon the event having particular details (e.g., having a particular performing entity or being located in a particular city). The reservation may lock a ticket fee. Thus, for example, an actor may reserve a ticket for an NFL football conference-championship game with the Dallas Cowboys as a team and for a particular seat and may be informed that the ticket, should it become available (e.g., if the Cowboys make it to the championship) would be offered for $400. In some instances, the price is not pre-determined. The actor would then be informed of the ticket price and could accept or decline purchasing the ticket.

Thus, event detailer 305 may collect available details for an event. Actor interface engine 310 can present the details and an option to reserve tickets for the event. An actor can opt to reserve tickets, which may include selecting one or more seats, submitting a reserve fee, agreeing to purchase the tickets if later made available, and/or submitting contact information. A ticket reserver 345 can then update ticket data store 240 to associate an identifier of the actor with an identifier of a potential ticket. Event detailer 305 can monitor for additional detail for the event.

Ticket reserver 345 can detect whether and when any conditions paired to the reservation (e.g., whether a particular performing entity will be performing at the event, whether the event will be held at a particular venue and/or whether the event is sufficiently defined for ticket sales) are met. Ticket reserver 345 can then cause actor interface engine 310 to offer the tickets for sale to the actor. Pricing monitor 330 can monitor to determine whether payment has been submitted during a reservation period. Clock 340 can be used by ticket reserver 345 to detect when a reserve period has expired. If payment has not been received in time, ticket reserver 345 can release the tickets in queue 240. Otherwise, ticket assigner 325 can assign the tickets to the actor.

Besides the difference in the fundamental difference in what constitutes holding a ticket versus reserving a ticket, the disclosure herein can otherwise apply similarly to either instance. For example, reservations may be biased towards good actors (e.g., only allowing them the opportunity to reserve tickets, allowing them to reserve tickets at a reduced or no fee, allowing them to reserve better tickets than other actors, etc.); reservation fees can require payment of initial fee; and/or reservations may be made for fixed time, which may be extended upon payment of an extension fee. In some instances, reservation and hold embodiments can be combined. For example, an actor may reserve 4 tickets for the NBA Finals with the Miami Heat playing. Should the Heat make it to the finals, the actor may receive an email asking whether he wishes to purchase 4 $225 tickets for consecutive lower-level seats. The actor may be able to place the tickets on hold for a maximum of 24 hours for a payment of $100. The actor may then request that an invitation be sent out to others with an account with system 150 who have indicated that they are fans of Miami Heat, live in Orlando and are alums of the University of Florida. Invitations may be appropriately sent, and actors may respond on a first-come first-serve basis to claim a ticket, which could require committing to pay $225. After three commitments have been received, the actor may choose to then purchase the tickets (in some embodiments) or the tickets may be automatically purchased.

Reserves and holds can thus be associated with two types of fees: a fee (an initial fee and/or an extension fee) for allowing the ticket to be reserved and/or held; and a fee for a subsequent purchase. One or both fees may, or may not, vary depending on a performing entity, venue, location, time, market demand (e.g., estimated based on a rate or acceleration of ticket sales, a number of bids on tickets sold on a secondary market and/or a price of tickets sold on a secondary market. Further, one or both fees may, or may not, depend on whether and/or to what extent an actor is characterized as a good actor.

Ticket engine 235 can include a group detector 350 that can detect a group of friends of an actor or a group of people estimated to share an interest with the actor or associated with an event. The group can include some or all some or all people: identified (e.g., by name, username or email address) by a particular actor identified in the actor's address book (e.g., in an email account), who are friends with the actor on a social networking site, who are members of a same fan group (e.g., an electronic or non-electronic fan group) and/or who are electronically "following" or "subscribed to" a same person or thing online.

The group can be detected based on a profile comparison (e.g., locating group members based on which profiles include information that matches profile information of a given actor's or a detail of an event). For example, group detector 350 may search account profiles that includes information entered by an actor (e.g., location, age, profession, favored artist(s), favored genre(s), favored event type(s), disfavored artist(s), disfavored genre(s) and/or disfavored event type(s)). If, e.g., Actor #1 is searching for other actors to attend an event with, group detector 350 may search for other actors likely to favor the event and being of an age and at a location similar to Actor #1.

The group can be detected based on online input, such as search terms (entered to system 150 or to another system, such as a search engine). In some instances, the online input relates to tickets for an event. For example, a group may be identified based on which actors requested tickets, requested or have tickets on hold, and/or requested or have tickets to be reserved. The group can also be influenced based on ticket-price restrictions or preferences and/or seat-location restrictions or preferences. Thus, e.g., group detector 350 may detect four individuals, each with multiple seats on hold in a location within the front 10 rows.

The group can be detected based on which websites actors' visited, how recently the websites were visited and a duration that the actors spent on the websites. For example, group detector 350 may detect, from amongst all actors with profile information indicating that they reside within a particular geographic region, the 10 actors who spent the most time on a fan site provided by a client or management system 150 during a second-to-last most recent month.

Group detector 350 may detect a group to facilitate coordination of a group to attend an event. The group may be detected upon receipt of input received by actor interface engine 310. For example, an actor may request or identify a willingness to attend a given event as part of a group. This request may be made while submitting another request (e.g., a request for tickets, a request for a ticket reservation and/or a request to have tickets be placed on hold). In some instances, the detection is automatically performed (e.g., upon an actor requesting that tickets be placed on hold, upon placing tickets on hold, and/or upon receiving a ticket request for a single ticket).

In one instance, group detector 350 attempts to identify groups of actors represented within queue 320 and/or having assigned tickets. Group detector 350 may, e.g., check to see if there are other actors in an actor's group in queue 320 or with assignments before it would add an identification of the actor to queue 320 or assign tickets to the actor. Group detector 350 may periodically or routinely evaluate ticket assignments and/or the queue to identify groups. In some instances, group detector 350 determines whether an actor is a part of a group upon receiving input corresponding to a request for a group analysis from the actor.

A group can be defined as all actors identified by group detector 350 as belonging to a same group. Alternatively, an actor may need to approve each detected actor before she is added to the group. In some instances, a group member is only added to a group if they have identified a willingness to join groups (e.g., generally or for a specific event). This willingness may be an absolute willingness (e.g., I am willing to join a group of up to N members to attend sporting event X) or a conditioned willingness (e.g., if I am unable to purchase 4 tickets, I am willing to join a group of others who are fans of the same team that I am).

If a group includes multiple members identified in queue 320 or multiple members with assigned tickets, group detector 350 may identify a modified queue-item ranking or modified ticket assignments that would place the group members next to each other in the queue or would assign nearby seats (e.g., consecutive or adjacent) to the group members. In various embodiments, the modification may be generated such that no group member is to receive a worse queue placement or seat assignment relative to his current placement or assignment, such that no group member is to receive a better queue placement or seat assignment relative to his current placement or assignment, or such that a statistic of group members' queue placement or seat assignment (e.g., average or median) before and after the modification remains substantially the same.

For queue placements, modifying placements to align group members consecutively may result in a swap of actor identifiers in the queue. For example, if two group members were ranked #1 and #27, a modification could include moving the second actor to position #2. This could be accomplished by swapping the placements of the actor originally at position #2 with the second actor (originally at position #27). Modifications may also include shifts. In the above example, actors identified originally at positions #2-26 may be shifted to positions #3-27.

These examples show instances where the modifications are, by themselves, disadvantageous to non-group-member actors. However, the modifications may be performed without the knowledge of non-group-member actors or of any group members. Alternatively, modification execution may be conditioned upon approval from non-group-member actors who would be influenced by the modification. In some instances, a modification may result in a fee being paid to the influenced non-group-member actor (e.g., from one or more group members, such as the one corresponding to a rank change). For example, an actor originally at position #27 may offer an actor originally at position #2 $50 to switch ranks. The fee may be set by a potentially transferring actor or by group detector 350. The fee may be fixed or may depend on, e.g., event details, a magnitude of a modification, a size of a queue, a size of a venue, a size of a group, and/or current ticket retail values.

Modifications may be advantageous to one or more non-group-member actors. For example, a modification can include moving an actor at position #1 in a queue to position #26, which may be accomplished by swapping positions with the actor originally at position #26 or incrementing the position of each actor at positions #2-26. Due to the resulting benefit, in some embodiments, any modification may not be identified to the influenced non-members, may not be contingent upon an approval of influenced non-member and/or may not result in a fee payment to influenced non-members (and/or result in a fee being paid by one or more group members). Transferring actors and/or group members may or may not be charged a fee.

In some instances, rather than move actors within the queue, the actors can be coalesced into a single placement. Thus, for example, if a queue had positions for a request from each of four actors, and if each request was for a single ticket, the requests could be combined into a single request for four tickets. A single group member would then be responsible for purchasing the tickets (or placing them on hold to collect contributions).

For modifications pertaining to ticket assignments, a modification could include trading of tickets or modifying two tickets to trade seats. In some instances, where one ticket has not been assigned, the modification may include assigning the ticket to a group member and releasing a ticket originally assigned to the group member.

An analysis to determine whether to modify ticket assignments and/or queue placements may requires permission from one or more actors. For example, it may be required that one, more or each an group member whose position or assignment would be influenced give permission; that one, more or each non-group-member actor whose position or assignment would be influenced give permission and/or that each group member give permission.

One or more fees may be involved in a modification. For example, a fee may be due to a client or operator of ticket management system 150 to identify a group, identify a possible modification to allow the group to sit together, to coordinate communication with involved non-group-member actors to determine whether such modification would be allowable, and/or to execute the modification. Further, a fee may be due to one or more involved non-group-member actors. In some instances, a ticket-price differential is also due. For example, if one group member purchased a row 45 seat for $75, and the modification would have him moving to a still-available row 1 seat that is retailing for $225, he may owe $150 for the difference in ticket price. (In instances where he would be trading for that seat, he may owe another actor the difference plus any additional modification fee.)

Any modification and/or fee payment may be contingent. For example, if a group includes four actors, modifications may be presented to involved actors and provisional responses may be received, but modifications may be executed only upon sufficient provisional responses that indicate that all four actors would be able to sit together.

Modifications can have restrictions. For example, a modification may be allowed only if at least one or all members in the group have been identified as being good actors. As another example, a modification may be allowed only if an actor initially requesting group detecting has a characterization score above a threshold. As another example, a modification may be prohibited during a time period relative to an event's beginning.

Group detector 350 can also act to identify groups for reasons beyond modifying group members' queue placement or ticket assignments. For example, group detector 350 can detect a group for an actor with tickets on hold. Ticket hold engine 335 can then send invitations to those group members to claim and/or contribute to a held ticket. As another example, ticket hold engine 335 can detect a group while or before an actor is at an event, such that the actor can coordinate a post- or pre-event celebration, can commute to and/or from the event together; or such that the actor can say 'hello' to others in the group. In these instances, group detector 350 may facilitate communication between group members (e.g., allowing members to send messages to each other), or group detector 350 may provide group members' name and/or contact information (e.g., phone number or email address) for the members to directly communicate.

Group member detection may again be automatic (e.g., upon detecting that an actor has placed a ticket purchase on hold, upon detecting that it is a threshold amount of time before an event's start time) and/or the detection may be performed upon detecting input corresponding to a request from an actor for group identification.

Figure 4:
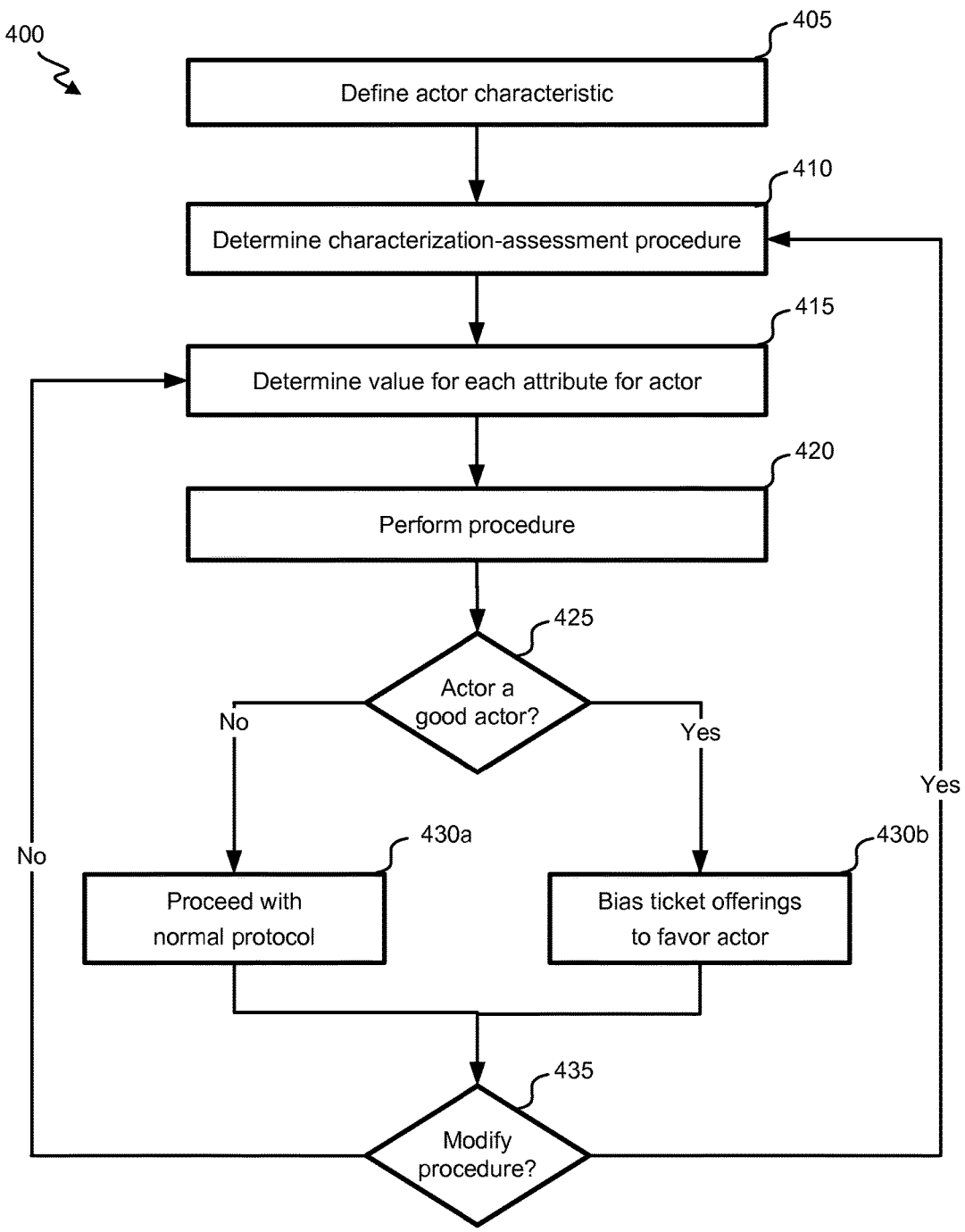
FIG. 4 illustrates a flowchart of an embodiment of a process for biasing ticket offerings to favor good actors.

FIG. 4 illustrates a flowchart of an embodiment of a process 400 for biasing ticket offerings to favor good actors. Process 400 begins at block 405, where actor characteristic definer 210 defines an actor characteristic. The characteristic can be one identified by a client or one indicative of being a true fan of a performer, indicative of being likely to attend an event, indicative of being unlikely to transfer a ticket to an event and/or being estimated to be a human and not a robot. The characteristic can itself be or can be associated with an indicator that is objective and/or quantifiable (e.g., number of past event attendances and/or duration of time as a member in a fan club).

Model engine 215 determines a characterization-assessment procedure at block 410. The procedure could involve evaluating values for a one or more attributes (e.g., by comparing them to a respective threshold). Model engine 215 can identify the attributes to use in the evaluation by, e.g., determining which attribute values correspond to (e.g., are correlated with) presence of the characteristic. A clustering, probabilistic and/or correlation technique can be used to identify attribute values tied to the characteristic's presence or an extent of the characteristic's presence. Model engine 215 may generate the procedure to include evaluation of one, some or all of the identified attributes. For example, others may be reserved for another characterization-assessment procedure to be used in later evaluations, to make it difficult for actors to guess the attributes being considered.

At block 415, good-actor detector 225 determines a value for each attribute used in the evaluation for an actor. The values can be determined by accessing account data, querying an actor for responses, requesting data from other systems and/or analyzing messages from a device of the actor. The value may be numeric and selected along a continuous or discrete scale. The value may be binary.

Using the value(s) and the procedure, good-actor detector 225 performs the characterization-assessment procedure at block 420. The procedure performance may include, e.g., generating a score, comparing a score or one or more attribute values to a corresponding threshold, and/or assigning a score or value set to a cluster.

Based on the performance, good-actor detector 225 estimates whether the actor is a good actor at decision block 425. For example, good-actor detector 225 may determine whether a value or score exceed a threshold in a good-actor direction (e.g., above or below the threshold) and/or determine whether a score or value set was assigned to a good-actor cluster. A criterion for making the estimation may be included in the characterization-assessment procedure determined by model engine 215.

Upon estimating that actor is a good actor, ticket engine 235 proceeds with normal protocols at block 430a. For example, ticket engine 235 may offer tickets in a normal order (e.g., adding the actor to a back of a queue), offer tickets in a normal fashion (e.g., requiring completion of one or more verification steps), offer tickets at normal prices, and/or offering a normal selection of tickets. Meanwhile, upon estimating that actor is a good actor, ticket engine 235 biases ticket offerings to favor the actor at block 430b. For example, the actor may be offered tickets not available to other actors, the actor may be offered tickets at a time that those tickets are not available to other actors, the actor may be offered tickets at a discounted price, and/or the actor may not be required to complete any or as many verification steps. In some instances, a good actor is granted favorable reserve or holding opportunities (e.g., being able to reserve or hold tickets while others are not, being able to reserve or hold tickets for a cheaper fee or for free while others must pay more, being able to reserve or hold tickets for longer periods of time, and/or being able to reserve or hold tickets before others are allowed to).

Model engine 215 determines whether the procedure is to be modified at decision block 435. The procedure may be modified at periodic or regular intervals to inhibit others from understanding fundamentals of the process. The procedure may be modified upon detecting a shift in a result of the procedures' implementations (e.g., detecting that a percentage of actors deemed to be good actors is changing). The procedure may be modified upon detecting a change in ticket actions (e.g., a number of actors purchasing, reserving or holding tickets) or in ticket inventory (e.g., a reduced number in available tickets).

If it is determined that the procedure is to be modified, process 400 returns to block 410 such that the procedure can be modified. In some instances, the procedure initially uses one or more attributes deemed to correlate with presence of the characteristic, and the procedure is modified to include a different one or more attributes deemed to correlate with presence of the characteristic. If it is not determined that the procedure is to be modified, process 400 continues to block 415 to evaluate whether another actor is a good actor.

It will be appreciated that, while process 400 is shown to determine whether an actor is a good actor, in other embodiments, process 400 may be modified to evaluate whether an actor is a bad actor (e.g., whether the actor lacks a characteristic, is unlikely to attend an event, or likely to be a robot). If it is estimated that the actor is likely to be a bad actor, ticket offerings may be biased to disfavor the actor.

Figure 5:
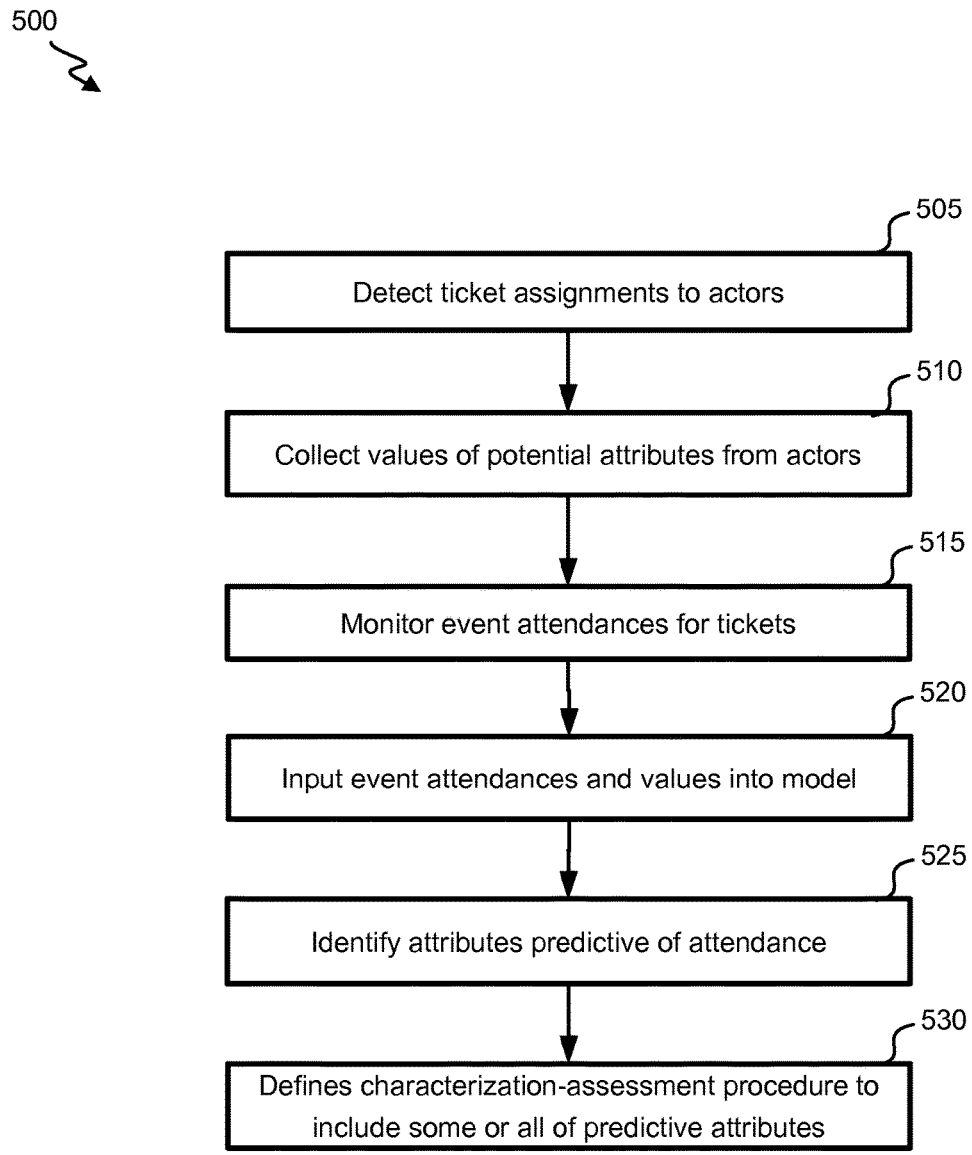
FIG. 5 illustrates a flowchart of an embodiment of a process for identifying attributes indicative of whether an actor is a good actor.

FIG. 5 illustrates a flowchart of an embodiment of a process 500 for identifying attributes indicative of whether an actor is a good actor. Process 500 begins at block 505, where ticket engine 235 detects tickets assigned to each actor in the set of actors. The set of actors can include all actors who purchased tickets (through system 150) or were assigned tickets (in system 150) to a particular event, to an event within a time period and/or to an event of a particular genre.

Model engine 215 collects, for each attribute in a set of attributes, a value for each actor in the set of actors at block 510. The set of attributes can include all attributes for which a value can be determined for at least a threshold number, a majority or all actors. The attributes can include attribute types as described herein. Attributes can be collected in a manner as described herein.

Attendance tracker 220 monitors which actors attended the event at block 520. For example, if a ticket assignment detected at block 505 was for a ticket to Event X and seat A47, the monitoring could determine whether the actor to whom the ticket was assigned attended the event and/or which actor attended the event. In some instances, the monitoring could determine whether an original ticket purchaser attended the event. The monitoring can occur by monitoring ticket history (e.g., which actor purchased the ticket, whether and what transfers of the ticket occurred and/or which actor redeemed the ticket). In some instances, the monitoring includes processing post-event input received from actors reporting to have attended the event.

Model engine 215 inputs, into a model, event-attendance data and attribute-value data at block 520. The model can be defined to identify variable dependencies and can include techniques as described herein. Using the model, model engine 215 identifies one or more attributes predictive of whether a purchasing actor will attend an event at block 525. The identification can include assessing significance values (e.g., identifying variables with a correlation or prediction significance surpassing a threshold being amongst a top-N list of attributes ranked according to correlation or prediction significance). The identification can include assessing a strength (e.g., a correlation magnitude or a prediction weight).

Model engine 215 defines a characterization-assessment procedure to include some or all of the predictive attributes at block 530. In some instances, the procedure includes fewer attributes than those identified at block 525. These may include selecting attributes with a strongest significance or strength value. These may include a portion of the attributes, the portion being randomly selected. A value of the selection can be that the procedure may later be modified to include other attributes, such that the procedure remains effective but also remains difficult for outsiders to understand due to the change.

Figure 6:
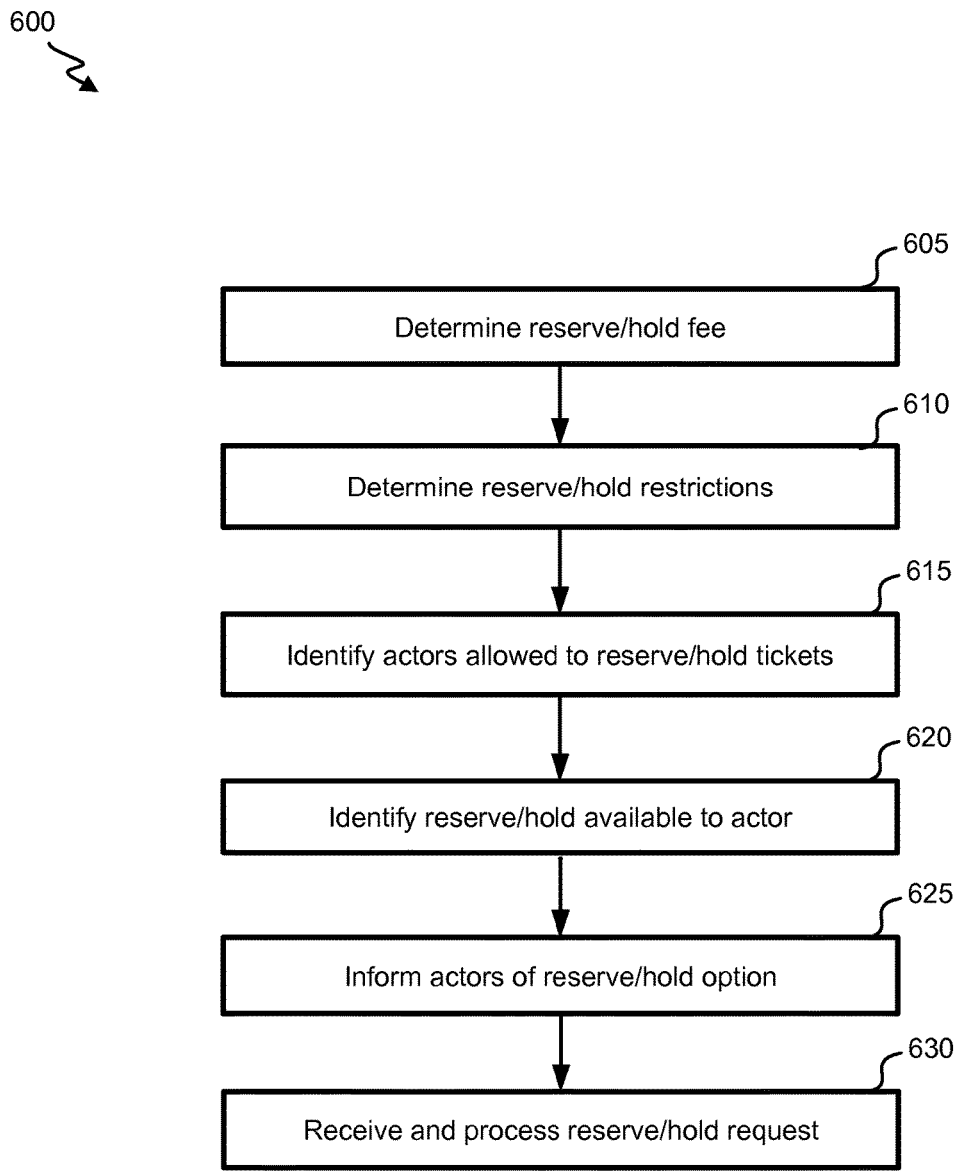
FIG. 6 illustrates a flowchart of an embodiment of a process for presenting a ticket holder with an opportunity to reserve or hold a ticket.

FIG. 6 illustrates a flowchart of an embodiment of a process 600 for presenting an actor with an opportunity to reserve or hold a ticket. Process 600 begins at block 605, where ticket reserver 345 or ticket hold engine 335 determines a reserve or hold fee. The fee can include an initial fee and/or one or more extension fee. In some instances, a single fee is determined. In other instances, different fees are determined. For example, a fee may depend on an event type, a performing entity, a seat location, whether or to what extent an actor is determined to be a good actor, a demand for the ticket (e.g., estimated based on a number of general requests or section-specific requests for the event), and/or a value for the ticket (e.g., estimated based on auction sales for the event).

Ticket reserver 345 or ticket hold engine 335 determines whether there are any applicable reserve or hold restrictions at block 610. The restrictions may limit, e.g., for how long tickets can be held or reserved, types of tickets that can be held or reserved, or actions that can be performed while tickets are on hold or reserved (e.g., limiting an ability to request other tickets). Restrictions can be general or can depend on specifics such as those noted above (e.g., an event type, performing entity, etc.).

Ticket reserver 345 or ticket hold engine 335 identifies actors allowed to reserve or hold tickets at block at bock 615. For example, in some instances, only actors identified as being good actors can reserve or hold tickets. In some instances, the identification can depend on seat locations or performing entities associated with the tickets, when an actor is attempting to reserve or hold ticket, a number of tickets that an actor is attempting to reserve or hold, or a duration of a hold or reserve. For example, any actor may be able to hold one or two tickets for an event more than a month away, but only good actors may be able to hold three or more tickets or to hold tickets for an event less than a month away.

For a given actor, ticket reserver 345 or ticket hold engine 335 identifies what reserve or hold is available at block 620. The identification can include first determining whether any reserve or hold is available to the actor (e.g., based on the identification at block 620). If so, the identification can further include determining what type of reserve or hold is available to the actor (e.g., based on the restrictions determined at block 610). The identification can also include determining what fee(s) would be associated with the reserve or hold (e.g., based on the determination at block 605 and, potentially, selecting one or more particular fees from those determined based on whether or an extent to which the actor is identified as being a good actor). For example, ticket hold engine 335 may determine that the actor can place a hold on tickets in sections 3-10 due to his characterization as being a good actor. Ticket hold engine 335 can determine that tickets in section 3 can only be held for up to 24 hours, while hold periods can be extended by 24 hours for tickets in sections 4-10 can be held for up to one week. Ticket hold engine 335 can then determine separate initial hold fees for each of sections 3-10 and extension hold fees for each of sections 4-10.

Actor interface engine 310 informs actors of available reserve or hold options at block 625. For example, actor interface engine 310 can present a presentation of a seat map that identifies seats that can be held or reserved. For example, these seats may be visually distinguished from other seats by color or texture. The presentation can further include representations of various fees or restrictions applicable to various holds or tickets. For example, a texture on seat representations on a seat map can represent whether a ticket for the seat can be reserved or held for more than initial period and a color of the texture can represent a fee for an unextended reservation or hold. The presentation can be presented to the actor on a webpage or app or transmitted to an actor's email account or phone. The information can be presented to the actor after receiving input from the actor suggesting that the actor may be interested in the event and/or hold or reservation possibilities or may be automatically presented regardless of received input.

Ticket reserver 345 or ticket hold engine 335 receives and processes reserve or hold requests at block 630. For example, an actor may select a seat from a seat map and request that tickets for those seats be held. Ticket hold engine 335 can communicate with payment engine 230 to collect any required fees and then place the tickets on hold.

Figure 7:
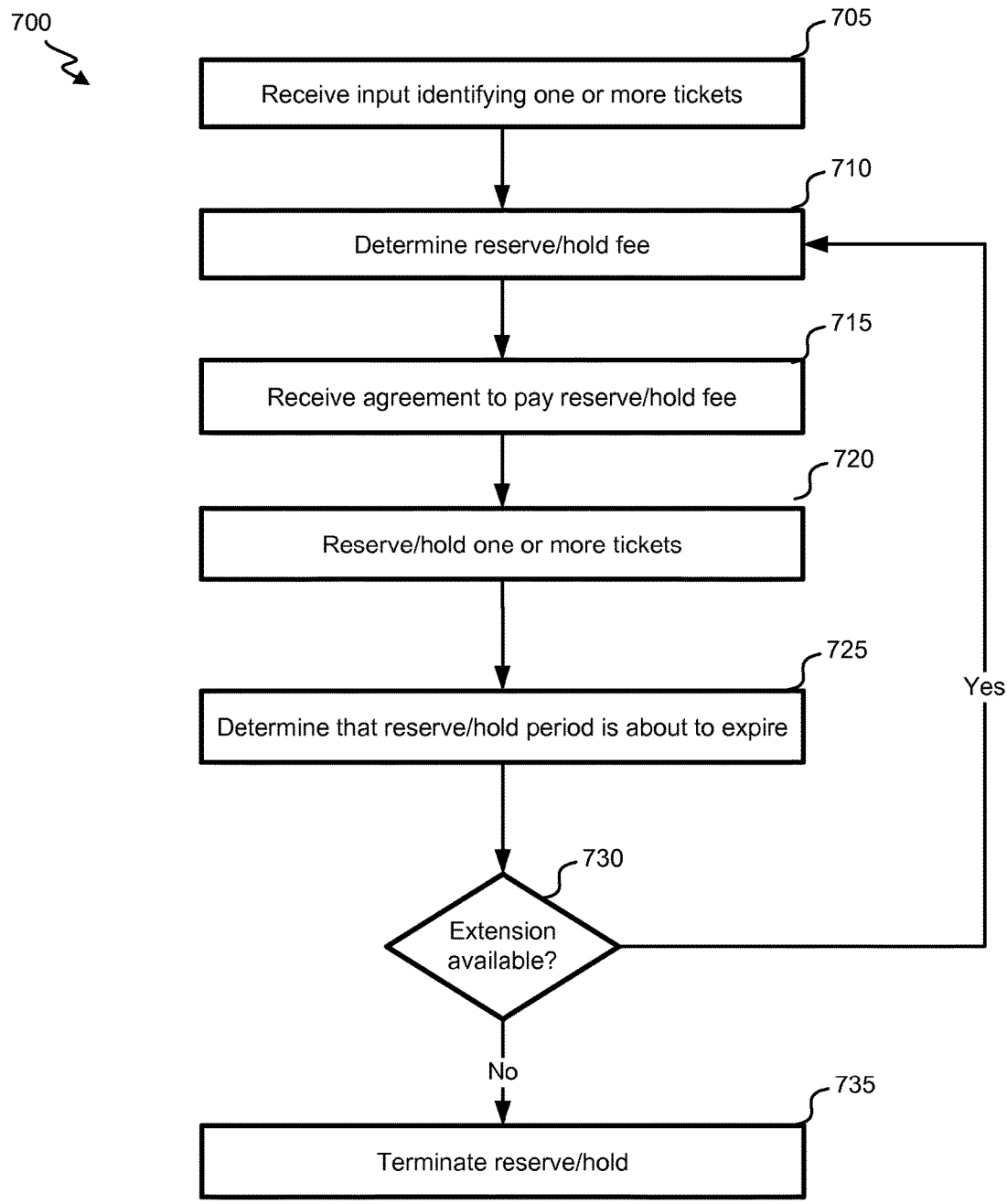
FIG. 7 illustrates a flowchart of an embodiment of a process for holding or reserving a ticket.

FIG. 7 illustrates a flowchart of an embodiment of a process 700 for holding or reserving a ticket. Process 700 begins at block 705, where actor interface engine 310 receives input identifying one or more tickets. The input can include a request to hold or reserve the tickets.

Ticket reserver 345 or ticket hold engine 335 determines a reserve or hold fee at block 710. The fee can include an initial fee. The fee can be determined based on the event, an actor corresponding to the input received at block 310, the tickets identified at block 705 (e.g., seat locations), and/or a current market property (e.g., number of ticket requests) for the event.

Actor interface engine 310 receives an input corresponding to an agreement to pay the determined for one or more of the identified tickets at block 720. The input may include, e.g., identification of payment information, such as a credit card number or information to log into a payment-facilitating website. The input may, or may not, also correspond to an agreement to automatically pay for extension fees if the ticket(s) are not purchased or released prior to a holding or reserve time period and/or an agreement to automatically purchase the ticket(s) upon expiration of the holding or reserve time period if the hold or reserve is not released before then, or an agreement that the ticket(s) will be automatically released upon expiration of the holding or reserve time period if the ticket(s) are not purchased before then.

At block 725, ticket reserver 345 or ticket hold engine 335 determines that a reserve or hold period is about to expire. This determination may be made by communicating with clock 340 to determine a current time. Ticket reserver 345 or ticket hold engine 335 may compare a time difference between an initial hold or reserve time and a current time and may compare this time difference to the reserve or hold period. The period may be determined to be about to expire when, e.g., less than a threshold amount of time remains (e.g., 1 day, 6 hours, 1 hour, 30 minutes or 10 minutes). The time may be fixed or set by an actor holding or reserving the tickets.

At block 730, ticket reserver 345 or ticket hold engine 335 determines whether any extensions of the reserve or hold period are available. This determination can be determined based on the event, an actor corresponding to the input received at block 310, the tickets identified at block 705 (e.g., seat locations), how many extensions have been previously taken by the actor and/or a current market property (e.g., number of ticket requests) for the event. If an extension is available, process 700 returns to block 710 such that an extension fee can be determined and collected and a reserve or hold can be extended. In some instances, the extension fee is pre-determined (e.g., while an initial fee is determined). In some instances, an extension fee is pre-paid by an actor (e.g., if an actor requests holding tickets for an initial 48-hour period and for two 24-hour extension periods).

If an extension is not available, ticket reserver 345 or ticket hold engine 335 terminates the reserve or hold at block 735. This termination can include executing a default action, which may include assigning the tickets to the holding or reserving actor or releasing the tickets to one or more actors.

Process 700 provides ticket engine 235 with an opportunity to dynamically determine whether and when to offer various types of reserving or holding options and/or what to charge. For example, ticket sales to an event may be slow. Ticket engine 235 may then determine that ticket holds may be allowed to encourage group attendance to the event. It may further determine that many extensions may be secured by payment of per-extension fees. However, ticket engine 235 may begin to notice that the event's popularity is increasing and fewer tickets are remaining for purchase. Suppose that such detection is made while an actor's hold on a set of tickets is in its third extension period. As the end of the third extension period nears, ticket hold engine 335 may then determine that not more extensions are to be allowed or that an extension fee is to be increased. The holding actor may be informed of this determination prior to the extension period's expiration.

Figure 8:
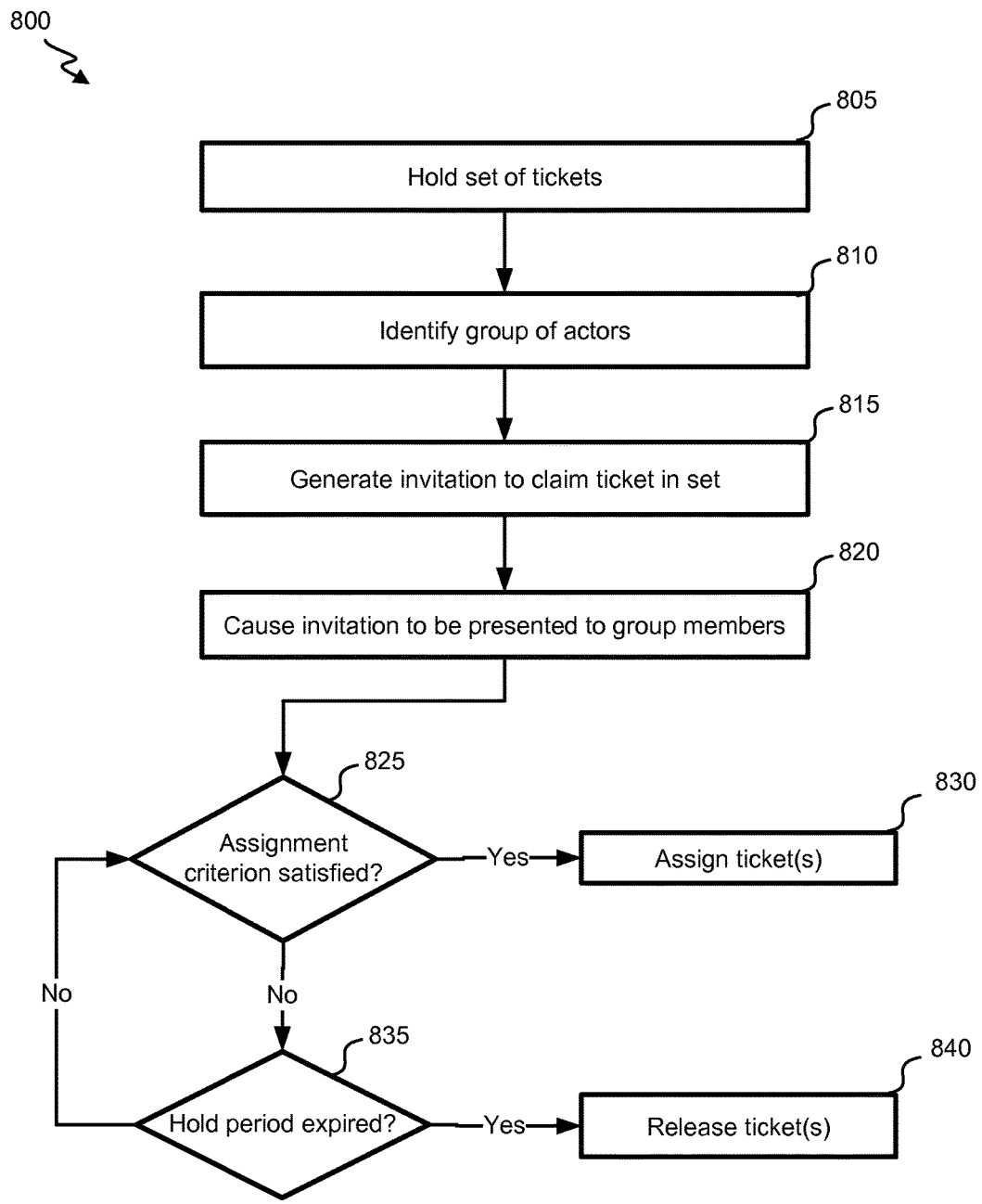
FIG. 8 illustrates a flowchart of an embodiment of a process for inviting members of a group to claim held tickets.

FIG. 8 illustrates a flowchart of an embodiment of a process 800 for inviting members of a group to claim held tickets. Process 800 begins at block 805, where ticket hold engine 335 holds a set of tickets for a holding actor. Group detector 350 identifies a group of actors at block 810. The group may include a group associated with the holding actor. The group can include members specified by the holding actors or automatically detected. Though the word "actors" is used, it will be appreciated that group members need not (in some instances) have performed any action with respect to system 150.

Group detector 350 generates an invitation to claim a ticket in the set at block 815. An invitation can include one to be sent to all group members, or an invitation can be generated for each group member. The invitation can include event details, information about the holding actor (e.g., his name), ticket information (e.g., a seat location and/or ticket price) and/or group information (e.g., identifying other group members having claimed a ticket). The invitation can include temporal information, such as a time at which a hold will expire or a time at which a group member can no longer claim a ticket in the set of tickets.

Group detector 350 causes the invitation to be presented to members in the group of actors at block 820. For example, the invitation can be transmitted to accounts on system 150 or email accounts. The invitation can be displayed on a webpage viewed by group members. At block 825, ticket assigner 325 determines whether an assignment criterion is satisfied. An assignment criterion can include payment of a fee. The fee may include a fee for a held ticket or may be less (e.g., if a holding actor intends to pay for part of the ticket) or more (e.g., to cover a holding fee). An assignment criterion can include an indication corresponding to an assertion from a group member that he intends to attend the event and/or pay for the ticket. The assignment criterion can be set by ticket hold engine 335 or set by a holding actor.

If an assignment criterion is determined to be satisfied, ticket assigner 325 assigns the ticket at block 830. The ticket may be assigned to the holding actor or to an actor causing the assignment criterion to be satisfied. For example, an actor may have responded to the invitation by claiming a ticket in the set of tickets or by contributing an amount to purchase a ticket in the set of tickets. The ticket may then be assigned to that actor. When a ticket is assigned to an actor other than the holding actor, the ticket may be initially assigned to the holding actor and then transferred to the other actor or assigned directly to the other actor. When the ticket is assigned to the holding actor, the assigned ticket may, or may not, have some identification of a group member for whom it is expected that the ticket will be used by.

If the assignment criterion is not satisfied, process 800 continues to decision block 835, where ticket hold engine 335 determines whether a hold period has expired. If so, ticket hold engine causes the hold to be released on any unassigned held tickets are released at block 840. If not, process 800 returns to 825, where ticket hold engine 335 continues to monitor fulfillment of the assignment criterion.

It will be appreciated that, in some embodiments, tickets are only assigned upon determination that a sufficient number of group members have responded to the invitations (e.g., by contributing to the purchase price or claiming tickets). For example, if an actor holds 7 tickets and only 1 person claims a ticket, the actor may not wish to attend the event at all. Thus, a holding actor (or a system default) may be able to identify a threshold number or percentage of tickets that must be claimed before any tickets are assigned. Process 800 may be modified accordingly.

Figure 9:
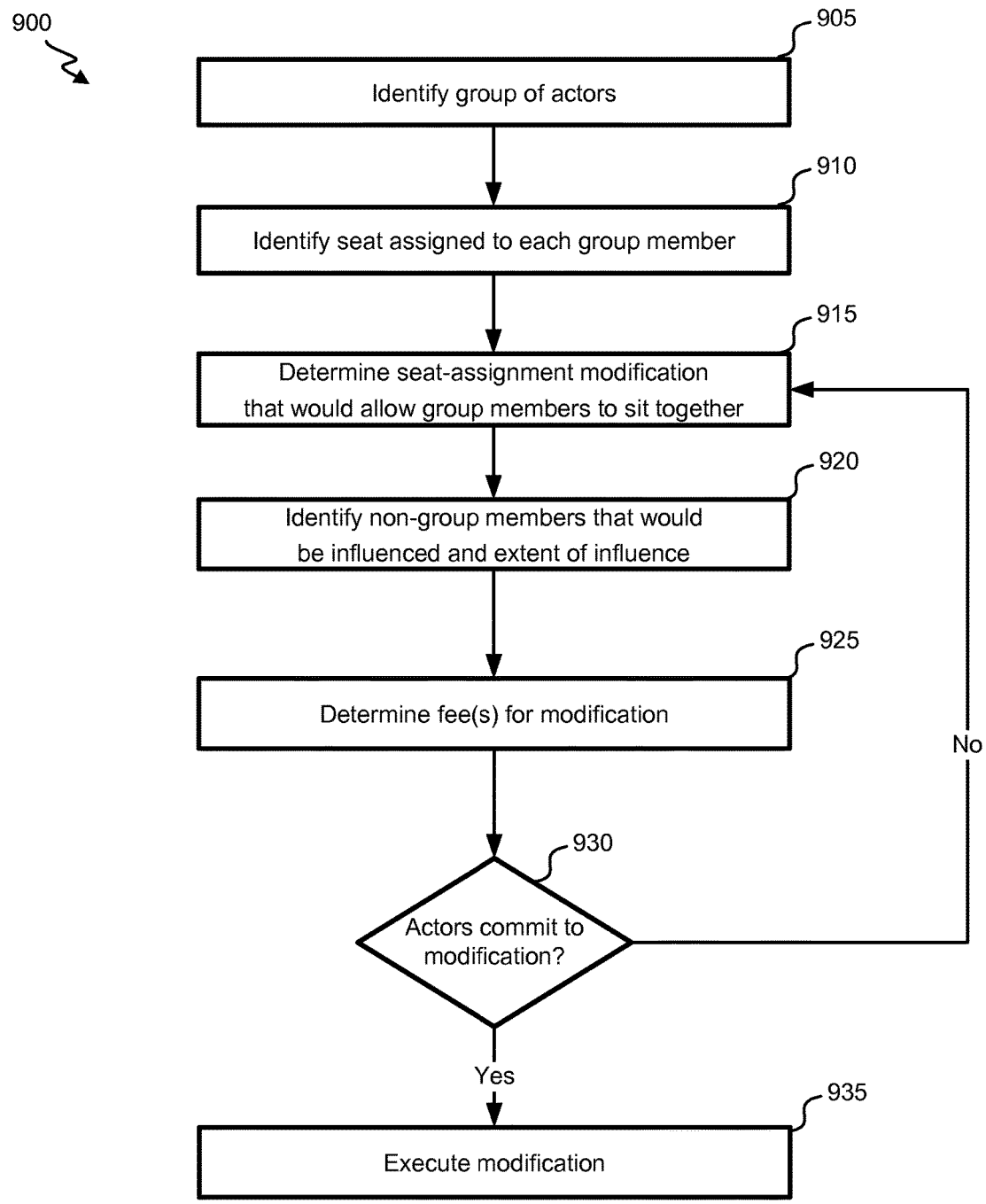
FIG. 9 illustrates a flowchart of an embodiment of a process for modifying ticket assignments to accommodate a group.

FIG. 9 illustrates a flowchart of an embodiment of a process 900 for modifying ticket assignments to accommodate a group. Process 900 begins at block 905, where group detector 350 identifies a group of actors. Each actor in the group of actors may be assigned a ticket. In some instances, at least one group of actors is assigned a ticket. In one instance, group detector 350 analyzes one, more or every actor assigned a ticket to determine whether other actors assigned a ticket are within a same group. Thus, e.g., group detector 350 may begin with a single actor and may then identify one, more or each group to which the single actor belongs. In some instances, multiple groups are combined (e.g., an email address book with a Facebook-friends group).

Process 900 may begin upon assignment of each ticket (e.g., to identify other actors in a same group as the actor to whom the ticket is being assigned). Process 900 may begin upon receiving a request from an actor to seat her with a group. Process 900 may begin at fixed times (e.g., finding all scattered groups at a given time point).

The group can include one specified by an actor (e.g., by names or seat numbers of others in the group) or one automatically detected (e.g., as described above). A group can have a size constraint (e.g., a requirement to include at least 4 actors and no more than 8 actors). In some instances, actors can opt-in or opt-out of an identified initial group or a single actor can edit an initial group (e.g., to remove an automatically detected group member).

Group detector 350 identifies a seat assigned to each group member at block 910. Ticket assigner can detect this information by querying queue 235. In some instances, one or more group members are not assigned a seat. In some instances, in order to be a member of a group, a potential group member may identify her willingness to be part of the group. In other instances, the group is identified without members' permission.

Ticket assigner 325 determines a seat-assignment modification that would allow group members to sit together at block 915. The modification could result in the group members being seated next to each other in a single row and/or in adjacent rows. For example, for a group of 8, a modification could result in the group members being seated next to each other in a single row or the group sitting along 4 consecutive seats in two adjacent rows. The modification may be performed in order to allow at least one group member retain his initial seat. The modification may be performed in an effort to reduce or minimize upgrading or downgrading seats and/or prices (e.g., according to a default or preference by a group member). In some instance, the group members are queried to determine which modification would be preferred (e.g., moving all members to be near the best seat or to be near the worst seat or an intermediate option). The modification may involve changing a member's seat and changing a non-member's seat. For example, a member may trade his seat for a non-member's seat.

As another example, intermediate seat adjustments are involved. For example, group member #1 may take non-group member #1 seat, non-group member #2 may take non-group member #1's seat, and group member #1 may take non-group member #2's seat. As another example, a modification may include having a group member exchange his ticket for an available ticket. As another example, a modification may include a non-group-member actor selling his ticket (without receiving another as part of the modification), and the group member buying the ticket. Which modification is selected from amongst probabilities may depend on respective probabilities that a modification would be satisfactory to group members, would be accepted by influenced non-group members, would charge or return an amount satisfactory to one or more group members, would limit or minimize an overall extent to which group members' and/or non-group-member actors' seats changed (while still congregating group members).

Ticket assigner 325 identifies non-group member that would be influenced by the modification and/or the extent of the influence at block 920. These actors can include non-group members who would be exchanging their seats for other seats (e.g., seats of other non-group members or group members) as part of the modification. The identification can further include determining a magnitude of the influence (e.g., a number of rows changed, a seat-ranking changed, a seat-popularity changed, or a change in the time that the ticket for the seat was sold).

Group detector 350 determines one or more fees for the modification at block 925. The fee can be automatically determined (e.g., based on the magnitude of influence, market factors, sale prices) or can be set by one or more actors (e.g., after viewing the influence or extent of influence). For example, if one group member had requested detection of a group or requested that an attempt to group be congregated be made, that actor may set the fees. The one or more fees can include one that would be paid to or collected from a non-group-member actor who would be influenced by the modification. The one or more fees can include a fee that that would be paid to or collected from a group-member actor who would be influenced by the modification. A fee paid to or collected from a non-group-member actor may, or may not, be equal to a corresponding payment collected from or paid to a group-member actor. For example, a single group member may opt to pay for all modification fees, or an additional modification fee may be due to a client or party operating system 150.

Actor interface engine 310 determines whether pertinent actors would approve the modification at block 930. For example, actor interface engine 310 can send a message to each non-group-member actor who would be influenced by the modification and ask whether she would be willing to change her seat for the determined respective fee. In some instances, the message would identify another seat where she would be seated during the event if the modification was performed. In some instances, the message may propose merely selling her ticket (e.g., as an alternative to trading or as the primary option). The message may include a time limit for responding and may include instructions for responding. A message may also be sent to group members. The message may ask whether each group member would be willing to change his seat, may identify a fee that would be due or refunded for the modification, identify where the new seat would be and/or identify others in the group by whom he would be seated.

The decision made at block 930 may turn upon whether one, some or all influenced non-group-member actors agreed to the modification and/or whether one, some or all group members (e.g., only those with seat changes in the modifications, with fee charges in the modification, with seat downgrades in the modification) agreed to the modification.

If sufficient pertinent actors would approve the modification, ticket assigner 325 executes the modification at block 935. If sufficient pertinent actors would not approve the modification, process 900 returns to block 915, at which another seat-assignment modification is determined.

It will be appreciated that process 900 may be altered in various manners. For example, process 900 may be applied to queue placements rather than seat assignments. Influenced non-group-member actors may still need to agree to the modification, or (in other embodiments) may not.

Figure 10:
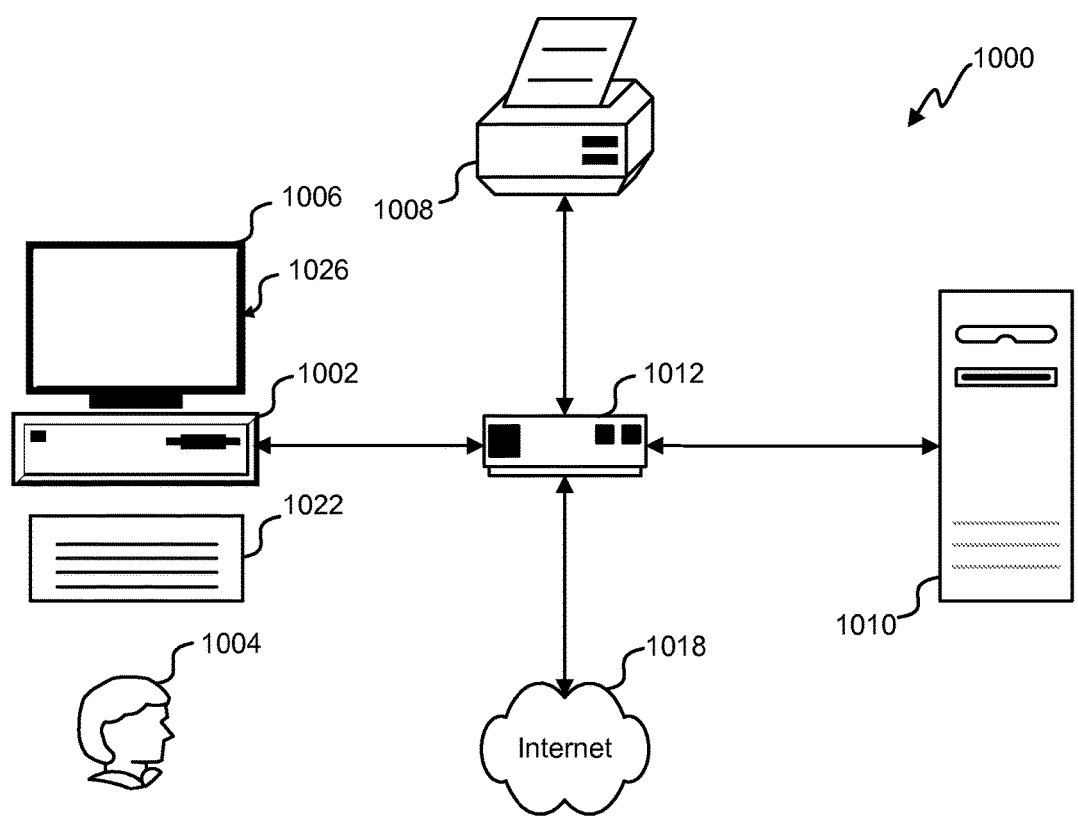
FIG. 10 depicts a block diagram of an embodiment of a computer system.

Referring next to FIG. 10, an exemplary environment with which embodiments can be implemented is shown with a computer system 1000 that can be used by a designer 1004 to design, for example, electronic designs. The computer system 1000 can include a computer 1002, keyboard 1022, a network router 1012, a printer 1008, and a monitor 1006. The monitor 1006, processor 1002 and keyboard 1022 are part of a computer system 1026, which can be a laptop computer, desktop computer, handheld computer, mainframe computer, etc. Monitor 1006 can be a CRT, flat screen, etc.

A designer 1004 can input commands into computer 1002 using various input devices, such as a mouse, keyboard 1022, track ball, touch screen, etc. If the computer system 1000 comprises a mainframe, a designer 1004 can access computer 1002 using, for example, a terminal or terminal interface. Additionally, computer system 1026 can be connected to a printer 1008 and a server 1010 using a network router 1012, which can connect to the Internet 1018 or a WAN.

Server 1010 can, for example, be used to store additional software programs and data. In one embodiment, software implementing the systems and methods described herein can be stored on a storage medium in server 1010. Thus, the software can be run from the storage medium in server 1010. In another embodiment, software implementing the systems and methods described herein can be stored on a storage medium in computer 1002. Thus, the software can be run from the storage medium in computer system 1026. Therefore, in this embodiment, the software can be used whether or not computer 1002 is connected to network router 1012. Printer 1008 can be connected directly to computer 1002, in which case, computer system 1026 can print whether or not it is connected to network router 1012.

Figure 11:
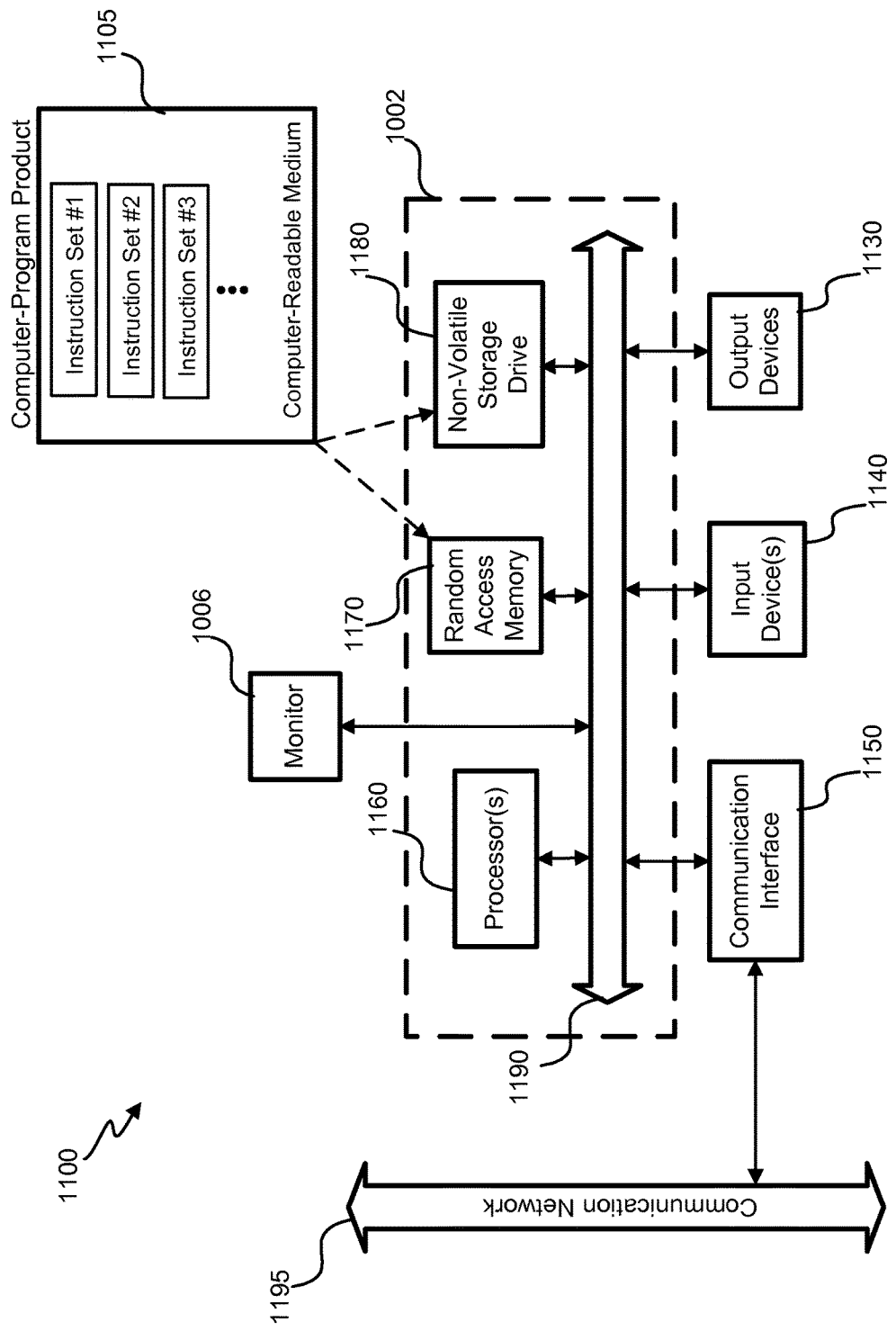
FIG. 11 depicts a block diagram of an embodiment of a special-purpose computer system.

With reference to FIG. 11, an embodiment of a special-purpose computer system 1100 is shown. Ticket management system 150 and/or any components thereof are examples of a special-purpose computer system 1100. Thus, for example, one or more special-purpose computer systems 1100 can be used to provide the function of ticket management system 150 or a component thereof (e.g., ticket engine 235 or queue manager 315). The above methods can be implemented by computer-program products that direct a computer system to perform the actions of the above-described methods and components. Each such computer-program product can comprise sets of instructions (codes) embodied on a computer-readable medium that directs the processor of a computer system to perform corresponding actions. The instructions can be configured to run in sequential order, or in parallel (such as under different processing threads), or in a combination thereof. After loading the computer-program products on a general purpose computer system 1026, it is transformed into the special-purpose computer system 1100.

Special-purpose computer system 1100 comprises a computer 1002, a monitor 1006 coupled to computer 1002, one or more additional user output devices 1130 (optional) coupled to computer 1002, one or more user input devices 1140 (e.g., keyboard, mouse, track ball, touch screen) coupled to computer 1002, an optional communications interface 1150 coupled to computer 1002, a computer-program product 1105 stored in a tangible computer-readable memory in computer 1002. Computer-program product 1105 directs system 1100 to perform the above-described methods. Computer 1002 can include one or more processors 1160 that communicate with a number of peripheral devices via a bus subsystem 1190. These peripheral devices can include user output device(s) 1130, user input device(s) 1140, communications interface 1150, and a storage subsystem, such as random access memory (RAM) 1170 and non-volatile storage drive 1180 (e.g., disk drive, optical drive, solid state drive), which are forms of tangible computer-readable memory.

Computer-program product 1105 can be stored in non-volatile storage drive 1190 or another computer-readable medium accessible to computer 1002 and loaded into memory 1170. Each processor 1160 can comprise a microprocessor, such as a microprocessor from Intel® or Advanced Micro Devices, Inc®, or the like. To support computer-program product 1105, the computer 1002 runs an operating system that handles the communications of product 1105 with the above-noted components, as well as the communications between the above-noted components in support of the computer-program product 1105. Exemplary operating systems include Windows® or the like from Microsoft Corporation, Solaris® from Sun Microsystems, LINUX, UNIX, and the like.

User input devices 1140 include all possible types of devices and mechanisms to input information to computer system 1002. These can include a keyboard, a keypad, a mouse, a scanner, a digital drawing pad, a touch screen incorporated into the display, audio input devices such as voice recognition systems, microphones, and other types of input devices. In various embodiments, user input devices 1140 are typically embodied as a computer mouse, a trackball, a track pad, a joystick, wireless remote, a drawing tablet, a voice command system. User input devices 1140 typically allow a user to select objects, icons, text and the like that appear on the monitor 1006 via a command such as a click of a button or the like. User output devices 1130 include all possible types of devices and mechanisms to output information from computer 1002. These can include a display (e.g., monitor 1006), printers, non-visual displays such as audio output devices, etc.

Communications interface 1150 provides an interface to other communication networks and devices and can serve as an interface to receive data from and transmit data to other systems, WANs and/or the Internet 1018. Embodiments of communications interface 1150 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 1150 can be coupled to a computer network, to a FireWire® bus, or the like. In other embodiments, communications interface 1150 can be physically integrated on the motherboard of computer 1002, and/or can be a software program, or the like.

RAM 1170 and non-volatile storage drive 1180 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 1170 and non-volatile storage drive 1180 can be configured to store the basic programming and data constructs that provide the functionality of various embodiments of the present invention, as described above.

Software instruction sets that provide the functionality of the present invention can be stored in RAM 1170 and non-volatile storage drive 1180. These instruction sets or code can be executed by processor(s) 1160. RAM 1170 and non-volatile storage drive 1180 can also provide a repository to store data and data structures used in accordance with the present invention. RAM 1170 and non-volatile storage drive 1180 can include a number of memories including a main random access memory (RAM) to store of instructions and data during program execution and a read-only memory (ROM) in which fixed instructions are stored. RAM 1170 and non-volatile storage drive 1180 can include a file storage subsystem providing persistent (non-volatile) storage of program and/or data files. RAM 1170 and non-volatile storage drive 1180 can also include removable storage systems, such as removable flash memory.

Bus subsystem 1190 provides a mechanism to allow the various components and subsystems of computer 1002 communicate with each other as intended. Although bus subsystem 1190 is shown schematically as a single bus, alternative embodiments of the bus subsystem can utilize multiple busses or communication paths within computer 1002.

It will be appreciated that embodiments disclosed herein with respect to a single ticket may also (e.g., in other embodiments) pertain to a group of tickets, and the converse. Further, embodiments disclosed with respect to one or more tickets to a single event may, in other embodiments, relate to season tickets.

Specific details are given in the above description to provide a thorough understanding of the embodiments. However, it is understood that the embodiments can be practiced without these specific details. For example, circuits can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A ticket management system for dynamically selecting attributes indicative of human users, evaluating users and selectively presenting offers to estimated human users, the ticket management system comprising:
   one or more processors; and
   one or more memories coupled with the one or more processors, wherein the one or more processors and one or more memories comprising:
   a user characteristic definer that defines a user characteristic, the user characteristic being an estimation that a user is a human user, wherein:
      when the user corresponds to the user characteristic, the user is estimated to be a human user, and
      when the user does not correspond to the user characteristic, the user is estimated to be a robot user;
   a model engine that:
      identifies a model that enhances the user characteristic definer by detecting when users alter activity to cause the ticket management system to falsely characterize the users, the model including at least one machine-learning algorithm,
      automatically identifying, using the at least one machine-learning algorithm, an initial set of attributes based on the user characteristic, each attribute of the initial set of attributes being used to determine whether users correspond to the user characteristic, and at least one attribute of the initial set of attributes characterizing an engagement based on at least one of:
         interactions with the ticket management system,
         interactions with a social media system,
         membership to one or more groups,
         past event attendances, and
         information in user profiles;
      determines, for each user in a first set of users, a first value for each attribute in the initial set of attributes, the first value being indicative of an extent of the engagement;
      identifies a collection of users previously determined to correspond to the user characteristic;
      automatically detects whether a rate of increase of users in the collection of users meets or exceeds a threshold, the meeting or exceeding the threshold indicating a likelihood that one or more users have altered activity to cause the ticket management system to falsely characterize the one or more users as a human user;

in response to detecting that the rate of increase meets or exceeds the threshold, automatically determines to modify the initial set of attributes, each attribute in the modified set of attributes being used to determine whether users correspond to the user characteristic;

determines, for each user in a second set of users, a second value for each attribute in the modified set of attributes, the second value being indicative of an extent to which a user corresponds to the user characteristic; and continuously detecting, using the at least one learning algorithm, whether or not at least one user has altered activity to cause the ticket management system to falsely characterize the at least one user;

a human user detector that:

identifies a first group and a second group from amongst the first set of users based on the determined first values; and identifies a third group and a fourth group from amongst the second set of users based on the determined second values, wherein each user in the third group corresponds to the defined user characteristic, wherein each user in the fourth group does not correspond to the user characteristic, and wherein users in the second set of users are different from users in the first set of users; and a ticket engine that:

determines that ticket offerings are to be biased to favor users in the third group over users in the fourth group;

generates a digital presentation for each user in the second set of users based on the determination that ticket offerings are to be biased to favor users in the third group over users in the fourth group, the digital presentation being different for users in the third group than for users in the fourth group; and transmits the digital presentation to each user in the second set of users, the digital presentation causing an interface to be displayed when received at a user device associated with each user in the second set of users, the interface being configured to receive ticket requests when the interface is displayed at the user device associated with each user in the third group, and the interface being configured to not receive ticket requests when the interface is displayed at the user device associated with each user in the fourth group.

2. The ticket management system for dynamically selecting attributes indicative of human users, evaluating users and selectively presenting offers to estimated human users as recited in claim 1, further comprising:

causing offers for tickets for seats at high-demand locations in a venue to be selectively presented to users in the third group.

3. The ticket management system for dynamically selecting attributes indicative of human users, evaluating users and selectively presenting offers to estimated human users as recited in claim 1, further comprising:

causing offers for tickets at a discounted price to be selectively presented to users in the third group.

4. The ticket management system for dynamically selecting attributes indicative of human users, evaluating users and selectively presenting offers to estimated human users as recited in claim 1, wherein the model engine further detects passing of a modification time, wherein the initial set of attributes is modified upon the detection, and wherein the attributes are modified irrespective of whether the specific modified attributes are estimated to be better predictors of the user characteristic over the specific initial attributes.

5. The ticket management system for dynamically selecting attributes indicative of human users, evaluating users and selectively presenting offers to estimated human users as recited in claim 1, wherein the model engine further:

receives data pertaining to a purchase by a purchaser of a ticket; and estimates whether the purchaser possessed the user characteristic, wherein the initial set of attributes is modified based on the estimation.

6. The ticket management system for dynamically selecting attributes indicative of human users, evaluating users and selectively presenting offers to estimated human users as recited in claim 5, wherein the ticket engine further biases ticket offerings to favor users in the first group over users in the second group, and wherein the purchasing data indicated whether a user in the first group attended an event.

7. The ticket management system for dynamically selecting attributes indicative of human users, evaluating users and selectively presenting offers to estimated human users as recited in claim 1, wherein the user characteristic includes a high probability of attending an event.

8. The ticket management system for dynamically selecting attributes indicative of human users, evaluating users and selectively presenting offers to estimated human users as recited in claim 1, wherein the attributes are indicative as to whether the users are fans of a performing entity.

9. The ticket management system for dynamically selecting attributes indicative of human users, evaluating users and selectively presenting offers to estimated human users as recited in claim 1, wherein the model engine further determines, for each attribute in the modified set of attributes, a weight, wherein the third group of users is identified based on the determined weights.

10. A method for dynamically selecting attributes indicative of human users, evaluating users and selectively presenting offers to estimated human users, method comprising:

defining a user characteristic, the user characteristic being an estimation that a user is a human user, wherein:

when the user corresponds to the user characteristic, the user is estimated to be a human user, and when the user does not correspond to the user characteristic, the user is estimated to be a robot user;

identifying a model that enhances the user characteristic definer by detecting when users alter activity to cause the ticket management system to falsely characterize the users, the model including at least one machine-learning algorithm, identifying, using the at least one machine-learning algorithm, an initial set of attributes based on the user characteristic, each attribute of the initial set of attributes being used to determine whether users correspond to the user characteristic, and at least one attribute of the initial set of attributes characterizing an engagement based on at least one of:

interactions with the ticket management system, interactions with a social media system, membership to one or more groups, past event attendances, and information in user profiles;

determining, for each user in a first set of users, a first value for each attribute in the initial set of attributes, the first value being indicative of an extent of the engagement;

identifying a first group and a second group from amongst the first set of users based on the determined first values;

identifying a collection of users previously determined to correspond to the user characteristic;

automatically detecting whether a rate of increase of users in the collection of users meets or exceeds a threshold, the meeting or exceeding the threshold indicating a likelihood that one or more users have altered activity to cause the ticket management system to falsely characterize the one or more users as a human user;

in response to detecting that the rate of increase meets or exceeds the threshold, automatically determining to modify the initial set of attributes, each attribute in the modified set of attributes being used to determine whether users correspond to the user characteristic;

determining, for each user in a second set of users, a second value for each attribute in the modified set of attributes, the second value being indicative of an extent to which a user corresponds to the user characteristic;

continuously detecting, using the at least one learning algorithm, whether or not at least one user has altered activity to cause the ticket management system to falsely characterize the at least one user;

identifying a third group and a fourth group from amongst the second set of users based on the determined second values, wherein each user in the third group corresponds to the defined user characteristic, wherein each user in the fourth group does not correspond to the user characteristic, and wherein users in the second set of users are different from users in the first set of users;

determining that ticket offerings are to be biased to favor users in the third group over users in the fourth group;

generating a digital presentation for each user in the second set of users based on the determination that ticket offerings are to be biased to favor users in the third group over users in the fourth group, the digital presentation being different for users in the third group than for users in the fourth group; and transmitting the digital presentation to each user in the second set of users, the digital presentation causing an interface to be displayed when received at a user device associated with each user in the second set of users, the interface being configured to receive ticket requests when the interface is displayed at the user device associated with each user in the third group, and the interface being configured to not receive ticket requests when the interface is displayed at the user device associated with each user in the fourth group.

11. The method for dynamically selecting attributes indicative of human users, evaluating users and selectively presenting offers to estimated human users as recited in claim 10, further comprising:

causing offers for tickets for seats at high-demand locations in a venue to be selectively presented to users in the third group.

12. The method for dynamically selecting attributes indicative of human users, evaluating users and selectively presenting offers to estimated human users as recited in claim 10, further comprising:

causing offers for tickets at a discounted price to be selectively presented to users in the third group.

13. The method for dynamically selecting attributes indicative of human users, evaluating users and selectively presenting offers to estimated human users as recited in claim 10, the method further comprising:

detecting passing of a modification time, wherein the initial set of attributes is modified upon the detection, and wherein the attributes are modified irrespective of whether the specific modified attributes are estimated to be better predictors of the user characteristic over the specific initial attributes.

14. The method for dynamically selecting attributes indicative of human users, evaluating users and selectively presenting offers to estimated human users as recited in claim 10, the method further comprising:

receiving data pertaining to a purchase by a purchaser of a ticket; and estimating whether the purchaser possessed the user characteristic, wherein the initial set of attributes is modified based on the estimation.

15. The method for dynamically selecting attributes indicative of human users, evaluating users and selectively presenting offers to estimated human users as recited in claim 14, the method further comprising:

biasing ticket offerings to favor users in the first group over users in the second group, wherein the purchasing data indicated whether a user in the first group attended an event.

16. The method for dynamically selecting attributes indicative of human users, evaluating users and selectively presenting offers to estimated human users as recited in claim 10, wherein the user characteristic includes a high probability of attending an event.

17. The method dynamically selecting attributes indicative of human users, evaluating users and selectively presenting offers to estimated human users as recited in claim 10, wherein the attributes are indicative as to whether the users are fans of a performing entity.

18. The method for dynamically selecting attributes indicative of human users, evaluating users and selectively presenting offers to estimated human users as recited in claim 10, the method further comprising determining, for each attribute in the modified set of attributes, a weight, wherein the third group of users is identified based on the determined weights.

19. A ticket management system for dynamically selecting attributes indicative of human users, evaluating users and selectively presenting offers to estimated human users, the ticket management system comprising:

one or more processors; and one or more memories coupled with the one or more processors, wherein the one or more processors and one or more memories are configured to:

define a user characteristic, the user characteristic being an estimation that a user is a human user, wherein:

when the user corresponds to the user characteristic, the user is estimated to be a human user, and when the user does not correspond to the user characteristic, the user is estimated to be a robot user;

identify a model that enhances the user characteristic definer by detecting when users alter activity to cause the ticket management system to falsely characterize the users, the model including at least one machine-learning algorithm, identify, using the at least one machine-learning algorithm, an initial set of attributes based on the user characteristic, each attribute of the initial set of attributes being used to determine whether users correspond to the user characteristic, and at least one attribute of the initial set of attributes characterizing an engagement based on at least one of:

interactions with the ticket management system,
interactions with a social media system,
membership to one or more groups,
past event attendances, and
information in user profiles;

determine, for each user in a first set of users, a first value for each attribute in the initial set of attributes, the first value being indicative of an extent of the engagement;

identify a first group and a second group from amongst the first set of users based on the determined first values;

identify a collection of users previously determined to correspond to the user characteristic;

automatically detect whether a rate of increase of users in the collection of users meets or exceeds a threshold, the meeting or exceeding the threshold indicating a likelihood that one or more users have altered activity to cause the ticket management system to falsely characterize the one or more users as a human user;

in response to detecting that the rate of increase meets or exceeds the threshold, automatically determine to modify the initial set of attributes, each attribute in the modified set of attributes being used to determine whether users correspond to the user characteristic;

determine, for each user in a second set of users, a second value for each attribute in the modified set of attributes, the second value being indicative of an extent to which a user corresponds to the user characteristic;

continuously detect, using the at least one learning algorithm, whether or not at least one user has altered activity to cause the ticket management system to falsely characterize the at least one user;

identify a third group and a fourth group from amongst the second set of users based on the determined second values, wherein each user in the third group corresponds to the defined user characteristic, wherein each user in the fourth group does not correspond to the user characteristic, and wherein users in the second set of users are different from users in the first set of users;

determine that ticket offerings are to be biased to favor users in the third group over users in the fourth group;

generate a digital presentation for each user in the second set of users based on the determination that ticket offerings are to be biased to favor users in the third group over users in the fourth group, the digital presentation being different for users in the third group than for users in the fourth group; and transmit the digital presentation to each user in the second set of users, the digital presentation causing an interface to be displayed when received at a user device associated with each user in the second set of users, the interface being configured to receive ticket requests when the interface is displayed at the user device associated with each user in the third group, and the interface being configured to not receive ticket requests when the interface is displayed at the user device associated with each user in the fourth group.

20. The ticket management system for dynamically selecting attributes indicative of human users, evaluating users and selectively presenting offers to estimated human users as recited in claim 19, wherein the one or more processors and one or more memories are further configured to:

detect passing of a modification time, wherein the initial set of attributes is modified upon the detection, and wherein the attributes are modified irrespective of whether the specific modified attributes are estimated to be better predictors of the user characteristic over the specific initial attributes.

\* \* \* \* \*